United States Patent
Grube et al.

(10) Patent No.: US 9,460,148 B2
(45) Date of Patent: Oct. 4, 2016

(54) COMPLETING DISTRIBUTION OF MULTI-MEDIA CONTENT TO AN ACCESSING DEVICE

(75) Inventors: Gary W. Grube, Barrington Hills, IL (US); S. Christopher Gladwin, Chicago, IL (US); Timothy W. Markison, Mesa, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1015 days.

(21) Appl. No.: 13/527,785

(22) Filed: Jun. 20, 2012

(65) Prior Publication Data
US 2013/0013761 A1    Jan. 10, 2013

Related U.S. Application Data

(60) Provisional application No. 61/505,013, filed on Jul. 6, 2011.

(51) Int. Cl.
*G06F 13/00* (2006.01)
*G06F 17/30* (2006.01)
(Continued)

(52) U.S. Cl.
CPC ... *G06F 17/30386* (2013.01); *G06F 17/30017* (2013.01); *H04L 1/0045* (2013.01); *H04L 65/4084* (2013.01); *H04L 65/80* (2013.01); *H04N 21/23103* (2013.01); *H04N 21/23109* (2013.01); *H04N 21/23113* (2013.01); *H04N 21/2407* (2013.01); *H04N 21/262* (2013.01);
(Continued)

(58) Field of Classification Search
CPC .............. G06F 17/30386; G06F 17/30017; H04L 1/0045; H04L 65/4084; H04L 65/80; H04N 21/23103; H04N 21/23109; H04N 21/23113; H04N 21/2407; H04N 21/262; H04N 21/6543; H04N 21/8456
USPC ......... 709/236, 223, 224, 230–232, 217–219
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Kenneth R Coulter
(74) *Attorney, Agent, or Firm* — Garlick & Markison; Timothy W. Markison

(57) ABSTRACT

A method begins by a dispersed storage (DS) processing module determining whether to complete downloading of a data segment of multi-media content to an accessing device that possess a partial set of encoded data slices. When the downloading is to be completed, the method continues with the DS processing module determining a user set of encoded data slices, wherein the user set of encoded data slices includes first and second sub-sets of encoded data slices of the set of encoded data slices, determining whether encoded data slices of the partial set of encoded data slices substantially matches encoded data slices of the first sub-set of encoded data slices, and when the encoded data slices of the partial set of encoded data slices substantially matches encoded data slices of the first sub-set of encoded data slices, sending the second sub-set of encoded data slices to the accessing device.

18 Claims, 22 Drawing Sheets

(51) Int. Cl.
  H04L 1/00       (2006.01)
  H04L 29/06      (2006.01)
  H04N 21/231     (2011.01)
  H04N 21/24      (2011.01)
  H04N 21/262     (2011.01)
  H04N 21/6543    (2011.01)
  H04N 21/845     (2011.01)

(52) U.S. Cl.
  CPC ...... *H04N 21/6543* (2013.01); *H04N 21/8456* (2013.01)

(56) References Cited

U.S. PATENT DOCUMENTS

| | | |
|---|---|---|
| 5,455,821 A * | 10/1995 | Schaeffer et al. ............. 370/332 |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner computing system 10

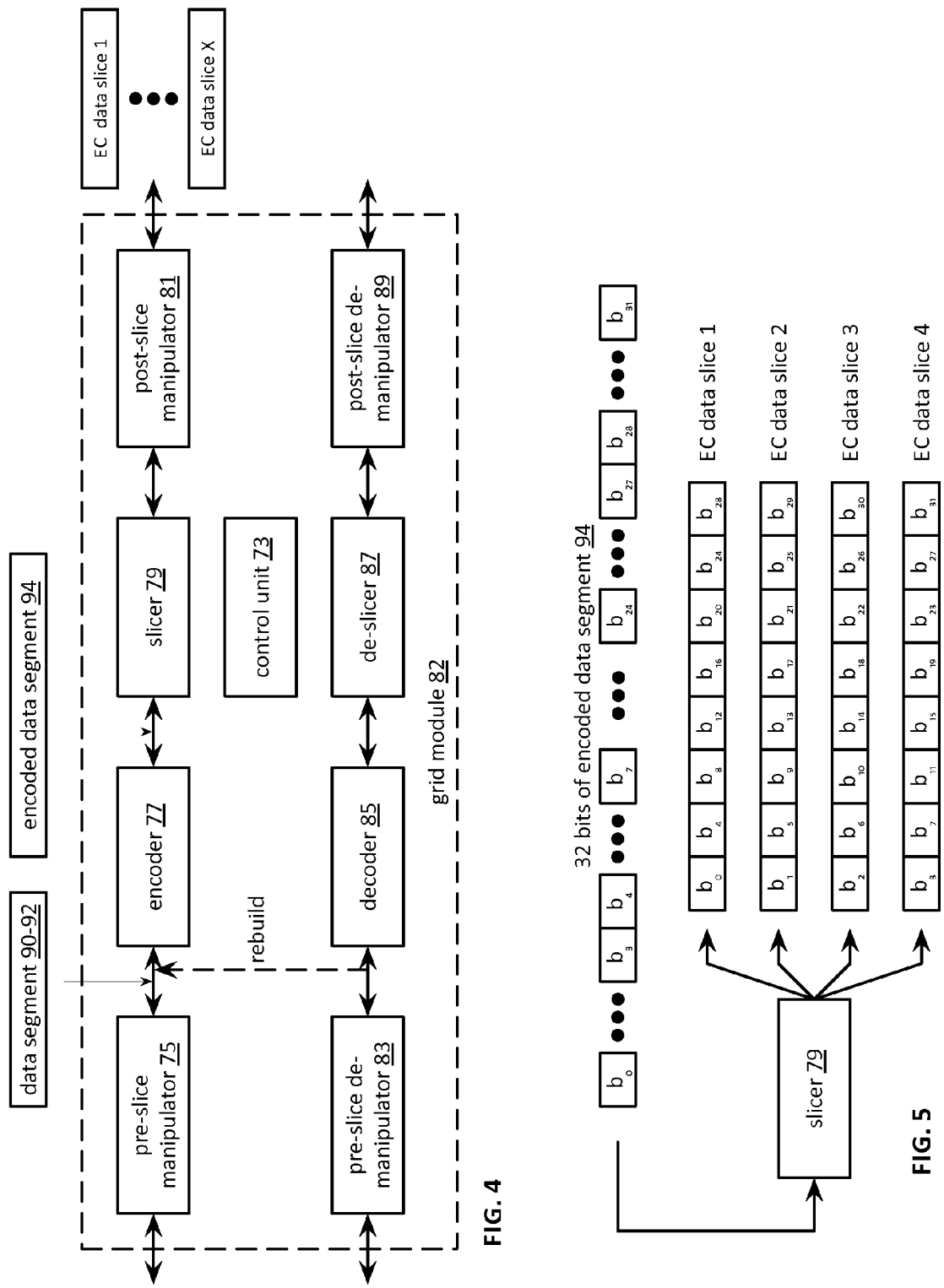

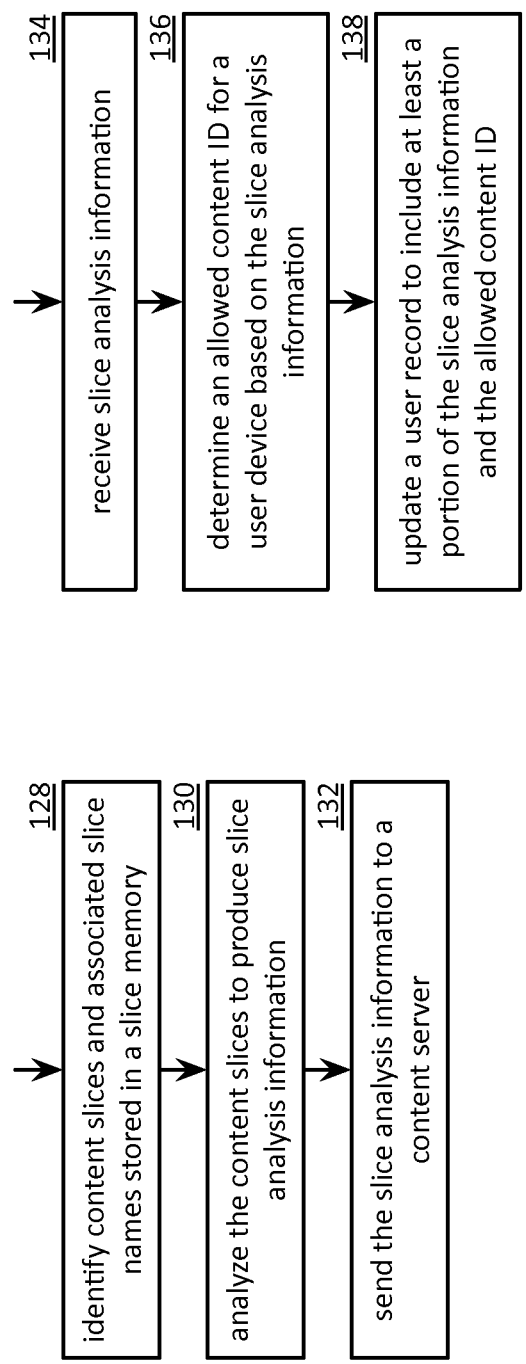

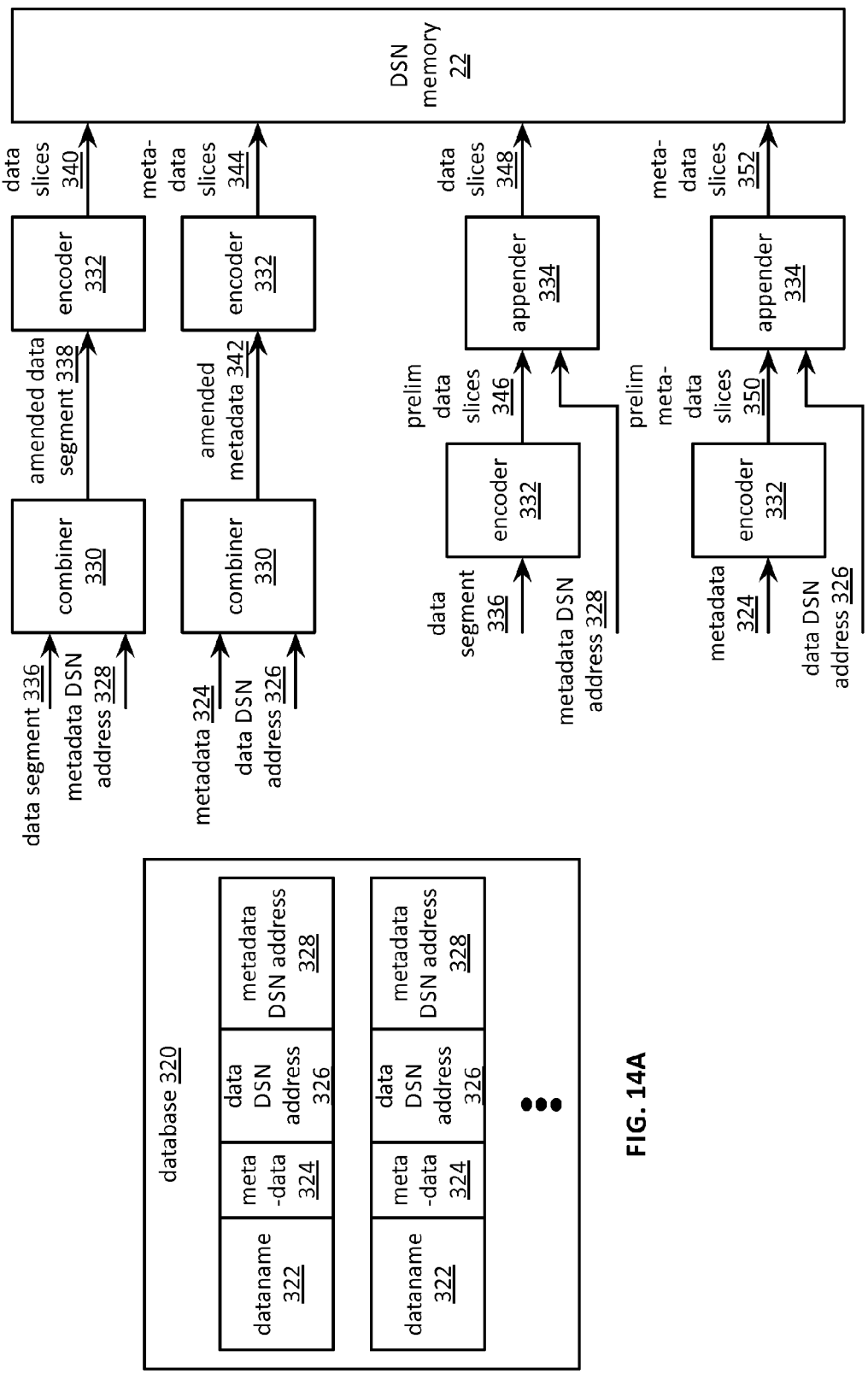

COMPLETING DISTRIBUTION OF MULTI-MEDIA CONTENT TO AN ACCESSING DEVICE

CROSS REFERENCE TO RELATED PATENTS

The present U.S. Utility patent application claims priority pursuant to 35 U.S.C. §119(e) to U.S. Provisional Application No. 61/505,013, entitled "Completing Retrieval of Content Stored in a Dispersed Storage Network," filed Jul. 6, 2011, pending, which is incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the present invention;

FIG. 5 is a diagram of an example embodiment of error coded data slice creation in accordance with the present invention;

FIG. 7A is a flowchart illustrating an example of verifying stored content in accordance with the present invention;

FIG. 7B is a flowchart illustrating another example of verifying stored content in accordance with the present invention;

FIG. 14A is a block diagram of an embodiment of a data storage structure in accordance with the present invention;

FIG. 14B is a block diagram of an embodiment of a data storage system in accordance with the present invention;

DETAILED DESCRIPTION OF THE INVENTION

Figure 1:
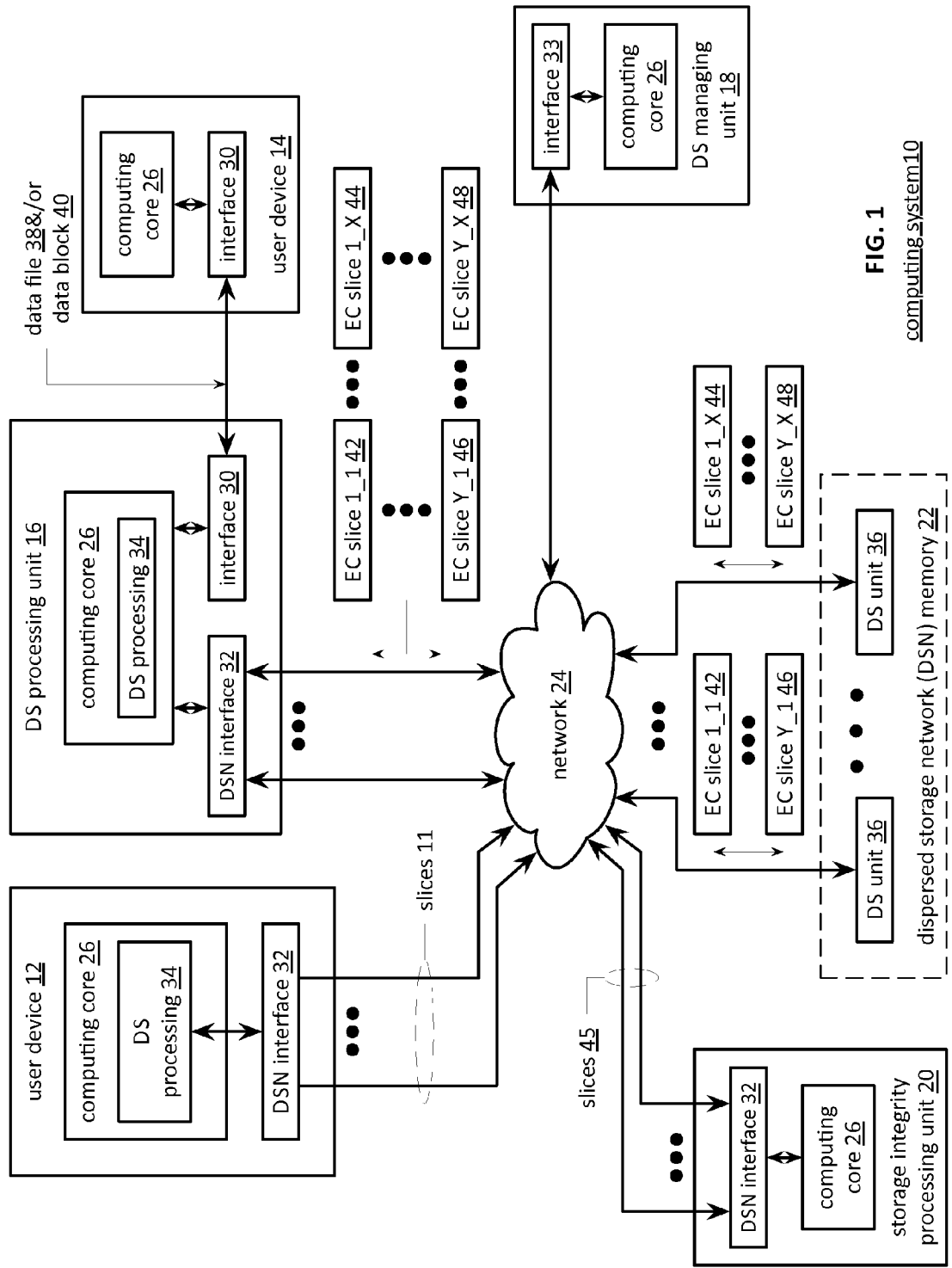
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
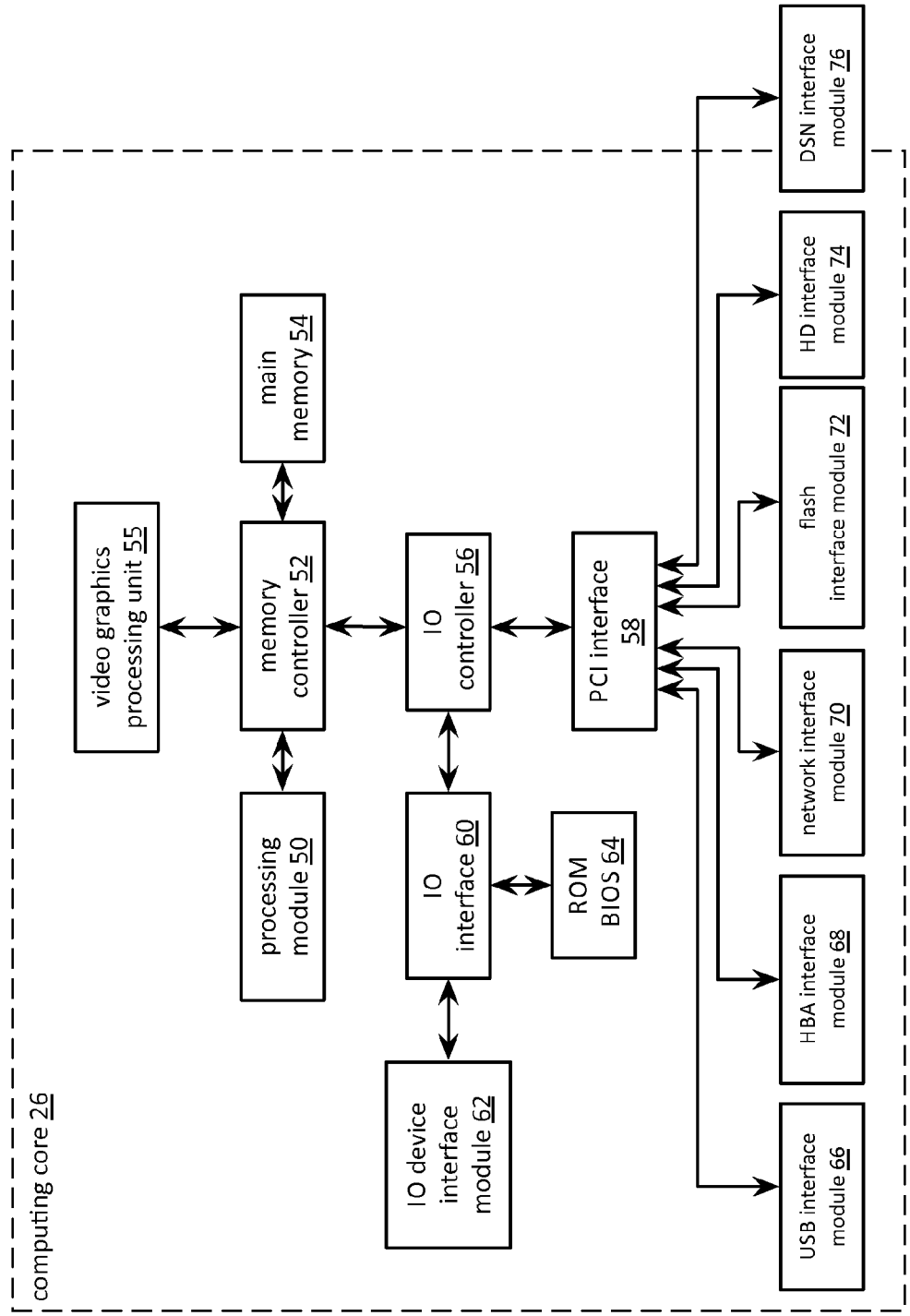
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
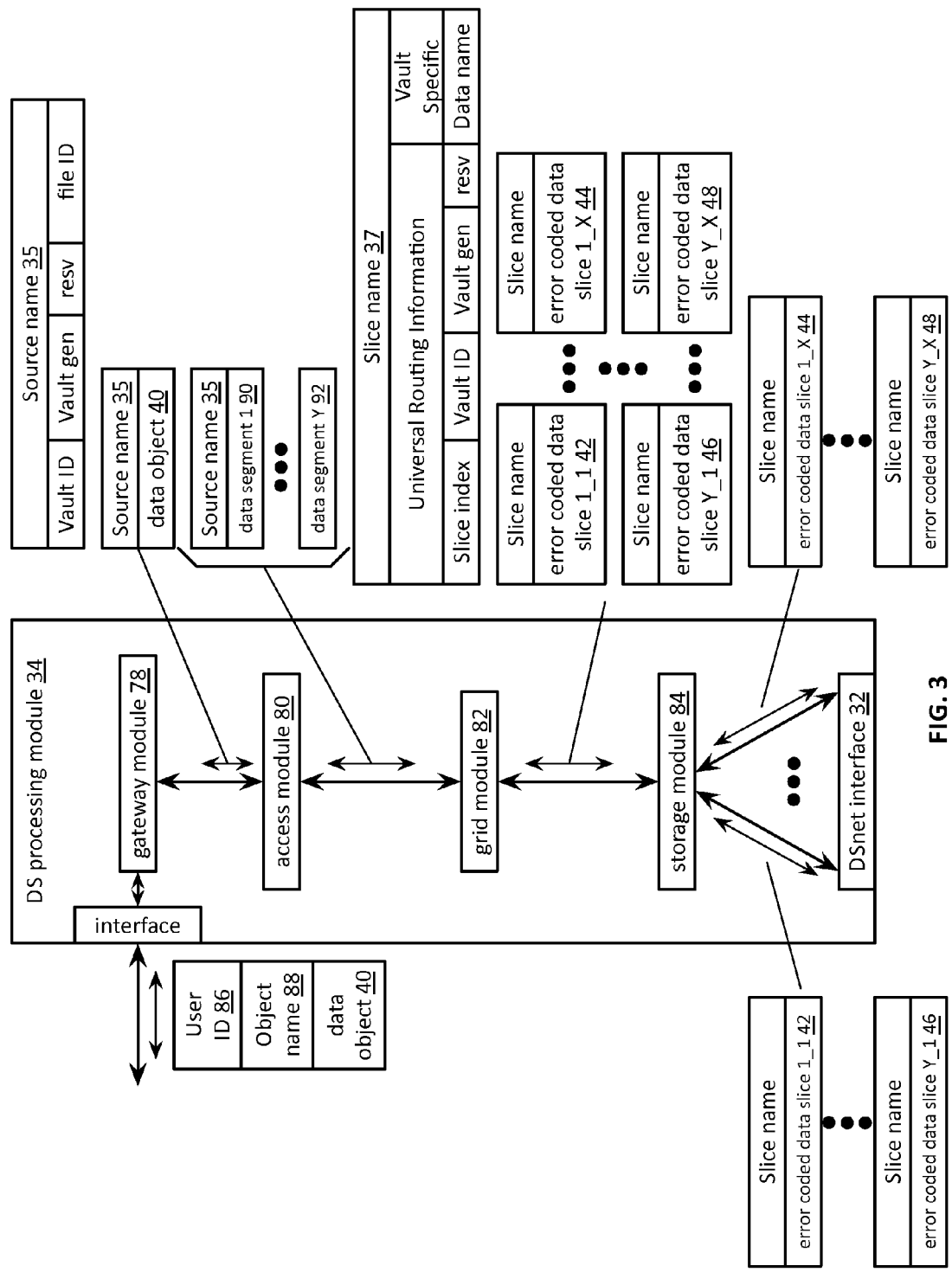
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
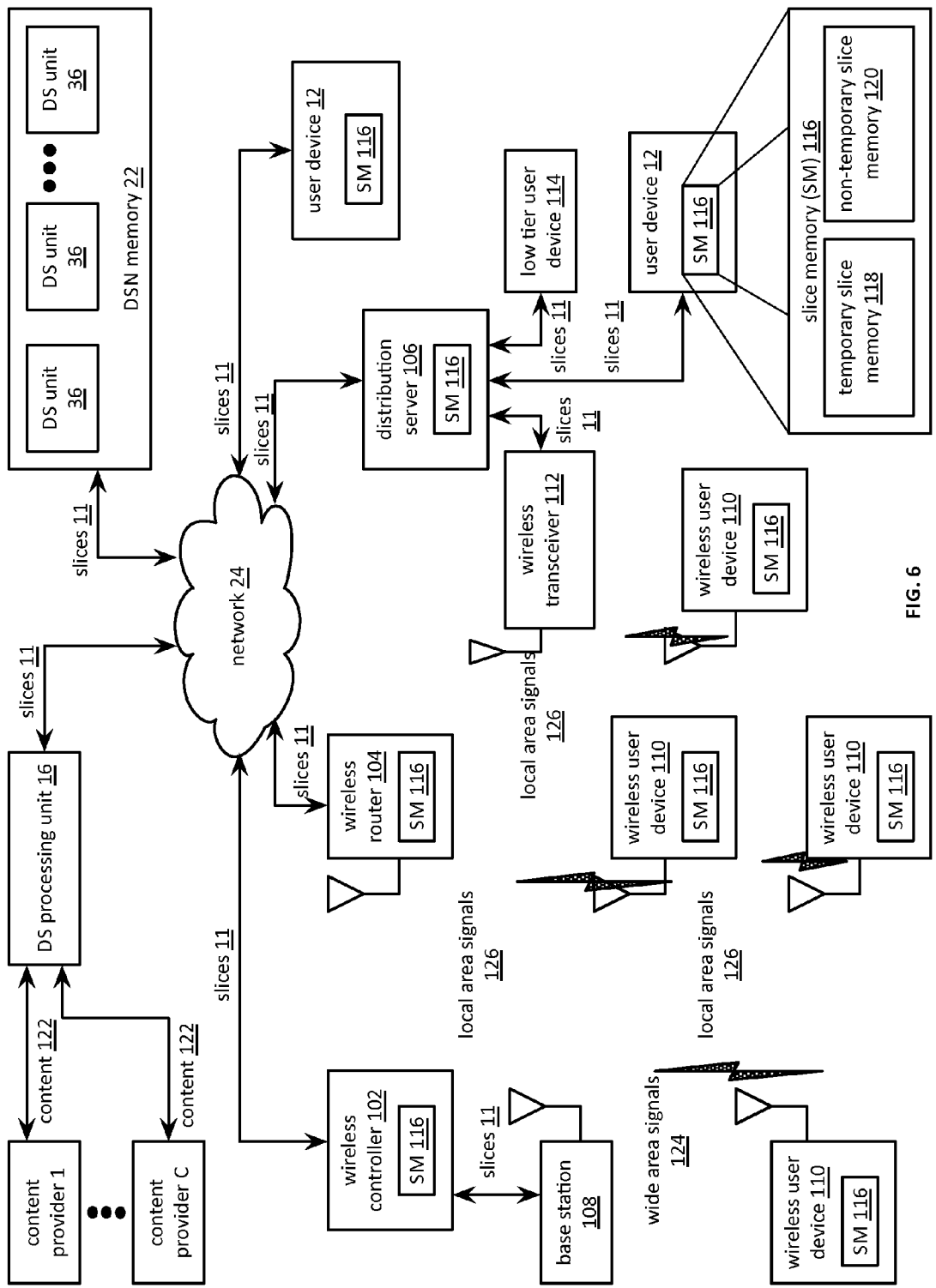
FIG. 6 is a schematic block diagram of another embodiment of a computing system in accordance with the present invention.

FIG. 6 is a schematic block diagram of another embodiment of a computing system. The computing system includes a plurality of content providers 1-C, a dispersed storage (DS) processing unit 16, a network 24, a dispersed storage network (DSN) memory 22, a wireless controller 102, a base station 108, a wireless router 104, a distribution server 106, a plurality of user devices 12, a wireless transceiver 112, a low tier user device 114, and a plurality of wireless user devices 110. The DSN memory 22 includes a plurality of DS units 36. The wireless controller 102, wireless router 104, distribution server 106, user device 12, and the wireless user device 110 may include a slice memory (SM) 116. The slice memory 116 includes a temporary slice memory when undertaking (e.g., for storing encoded data slices on a temporary basis) and a non-temporary slice memory 120 (e.g., for storing encoded data slices on a non-temporary basis).

Each content provider of the content providers 1-C aggregates and stores content 122 for distribution to one or more of the user devices (e.g., low tier user device 114, user device 12, wireless user device 110). The content 122 includes one or more of multimedia, video, movies, music, audio recordings, pictures, sound files, image files, applications, and software. The content 122 may be associated with a content descriptor including one or more of a content type, a genre type, an artist, a movie type, a music type, a release date, pricing information, purchase indicator information, a demographic indicator, a favorite syndicator, a quality rating, and an industry rating. The descriptor may be included with the content 122.

The DS processing unit 16 is operable to ingest content 122 by receiving the content 122 from at least one of the content providers 1-C, dispersed storage error encode at least some of the content 122 to produce slices, and send the slices to the DSN memory 22 for storage in at least some of the DS units 36. The DS processing unit 16 is further operable to distribute the content 122 by one or more of receiving a content request, facilitating sending of slices 11 associated with the content 122 of the request to a requesting entity (e.g., a user device), determining target content for a user device, facilitating temporarily storing some slices 11 (e.g., a first sub-set of public pillar slices) associated with the target content in the user device, and facilitating sending other slices 11 (e.g., second sub-sub of private pillar slices) associated with target content to the user device when the user device requests the target content.

The wireless controller 102 is operable to control the base station 108 such that the base station 108 converts slices 11 to wide-area signals 124 for transmission to one or more wireless user devices 110. The base station 108 may operate in accordance with one or more industry standards (e.g., global system for mobile communications (GSM), code division multiple access (CDMA), etc.) and is operable to transmit and receive wide-area signals. The wireless router 104 is operable to convert slices 11 into local area signals 126 for transmission to one or more wireless user devices 110. The wireless router 104 may operate in accordance with one or more industry standards (e.g., WIFI, Bluetooth, etc.) to transmit and receive the local area signals 126.

The distribution server 106 is operable to distribute slices 11 (e.g., via a wireline or wireless connection) to one or more of the wireless transceiver 112, the low tier user device 114, and the user device 12. The wireless transceiver 112 is operable to convert slices 11 into local area signals 126 for transmission to one or more wireless user devices 110. The wireless transceiver 112 may operate in accordance with one or more industry standards (e.g., WIFI, Bluetooth, etc.) to transmit and receive the local area signals 126.

The user device 12 and low tier user device 114 include wireline communication capability (e.g., a wireline interface). The wireless user device 110 includes a wireless transceiver and is operable to communicate wide area signals 124 and/or local area signals 126 with one or more of another wireless user device 110, the base station 108, the wireless router 104, and the wireless transceiver 112. The user device 12, low tier user device 114, and wireless user device 110 are operable to communicate with the computing system via one or more of the base station 108, the wireless router 104, the wireless transceiver 112, the distribution server 106, and the network 24 to receive public pillar slices for at least temporary storage, request target content, and receive private pillar slices for non-temporary storage.

The user device 12, low tier user device 114, and wireless user device 110 includes a DS processing and is operable to temporarily store public pillar slices, delete temporarily stored public pillar slices when such slices are not required, store private pillar slices, dispersed storage error decode slices into target content, dispersed storage error encode target content into slices, transcode slices that were encoded with a first set of dispersal parameters into slices encoded with a second set of dispersal parameters, determine user content preferences, identify target content, facilitate requesting target content, facilitate sharing target content, and consume target content (e.g., playing a movie, playing a music file, etc.)

In an example of operation, a wireless user device 100 and is operably coupled to the base station 108 and determines a user content preference and identifies target content associated with the user content preference. The wireless user device 110 identifies public pillars corresponding to the target content for a partial download. The wireless user device 110 determines a partial downloading schedule (e.g., sending slices on off hours such that base station effectiveness is not compromised) for retrieving public pillar encoded data slices corresponding to the public pillars. The wireless user device 110 facilitates partial downloading of the target content by facilitating sending of the public pillar encoded data slices 11 to the wireless user device 110 via the wireless controller 102 and the base station 108 utilizing the wide-area signals 124. For example, the wireless user device 110 sends a slice retrieval request to the DSN memory 22, wherein the request includes a slice name associated with a public pillar encoded data slice. Alternatively, or in addition to, the DS processing unit 16 determines the user content preference, identifies the target content, identifies the public pillars, determines the partial downloading schedule, and facilitates partial downloading of the target content.

In the example continued, the wireless user device 110 receives the public pillar encoded slices, via the wide area signals 124, of the target content and stores the slices 11 in temporary slice memory 118 of the wireless user device 110. Next, the wireless user device 110 determines whether the target content is desired. For example, the wireless user device 110 receives a user input that selects the target content to indicate that the target content is desired target content. When the target content is desired, the wireless user device 110 identifies one or more required private pillars of the desired target content and requests encoded data slices (e.g., from the DSN memory 22) corresponding to the one or more required private pillars, receives the private pillar encoded data slices via the wide area signals, stores the private pillar encoded data slices in non-temporary slice memory 120, and moves the public pillar encoded data slices from the temporary slice memory 118 to the non-temporary slice memory 120 of the wireless user device 110.

In another example of operation, a wireless user device 110 is operably coupled to the wireless router 104 and communicates with the DSN memory 22 via the wireless router 104 utilizing the local area signals 126. The wireless user device 110 may forward at least some of the public pillar encoded data slices to another wireless user device 110 operably coupled to the wireless user device 110 utilizing local area signals 126. In yet another example of operation, the low tier user device 114 communications with the DSN memory 22 via the distribution server 106 utilizing a wireline connection and facilitates storage of public pillar encoded data slices and private pillar encoded data slices in a slice memory 116 of the distribution server 106. As such, the low tier user device 114 accesses the slice memory 116 of the distribution server 106 to consume slices 11 as target content.

As yet another example of operation, the DS processing unit 16 selects a plurality of network edge units for staging public pillar encoded data slices. The plurality of network edge units includes one or more of the wireless controller 102, the wireless router 104, the distribution server 106, a user device 12, and a wireless user device 110. The DS processing unit 16 identifies target content for partial download to the plurality of network edge units. The DS processing unit 16 identifies public pillars corresponding to the target content for partial download and determines a partial downloading schedule for sending public pillar encoded data slices to each network edge unit of the plurality of network edge units. The DS processing unit 16 facilitates partial downloading of the target content by facilitating sending of the public pillar encoded data slices to each network edge unit of the plurality of network edge units.

In a continuation of the example, at least one of a user device 12 and a wireless user device 110 identify target content and identify public pillars corresponding to the target content. The at least one of the user device 12 and the wireless user device 110 requests a download of the public pillar encoded data slices from at least one of the plurality of network edge units. The at least one of the user device 12 and wireless user device 110 receives the public pillar encoded data slices of the target content and stores the public pillar encoded data slices in temporary slice memory 118 associated with the at least one of the user device 12 and the wireless user device 110. The at least one of the user device 12 and the wireless user device 110 downloads corresponding private pillar encoded data slices from at least one of the DSN memory 22 and one of the plurality of network edge units and stores the private pillar encoded data slices in non-temporary slice memory 120 associated with the at least one of the user device 12 and the wireless user device 110. The at least one of the user device 12 and the wireless user device 110 transfers the public pillar encoded data slices from the temporary slice memory 118 to the non-temporary slice memory 120. The method of operation of the computing system is described in greater detail with reference to FIGS. 7A-13.

FIG. 7A is a flowchart illustrating an example of verifying stored content. The method begins at step 128 where a processing module (e.g., a user device) identifies content slices and associated slice names stored in a slice memory. The identifying may be based on one or more of a data type indicator, a directory name, a filename extension, a slice pattern analysis, a comparison to a content slice, and a comparison of a hash of a slice to a content slice hash. For example, processing module identifies a slice as a content slice when an associated directory name includes a video filename extension.

The method continues at step 130 where the processing module analyzes the content slices to produce slice analysis information. The slice analysis information includes one or more of a user device identifier (ID), a content ID, a content type indicator, a content owner indicator, a vault ID, a content license, a content size indicator, a number of data segments indicator, a number of data slices indicator, a slice size indicator, and a slice name. Such analyzing may be based on one or more of slice names associated with the content slices, pillar numbers extracted from the slice names, data segment IDs extracted from the slice names, content of a segment allocation table, header information from a first data segment of content, counting a number of slices, and counting the number of bytes. The method continues at step 132 where the processing module sends the slice analysis information to a content server.

FIG. 7B is a flowchart illustrating another example of verifying stored content. The method begins at step 134 where a processing module (e.g., of a dispersed storage (DS) processing unit) receives slice analysis information (e.g., from a user device). The method continues at step 136 where the processing module determines an allowed content identifier (ID) for the user device based on the slice analysis information. The determination may be based on one or more of a user ID, a content ID, a permissions table lookup, a DS managing unit query, a content ID associated with the decode threshold number of slices, and a content license. For example, the processing module determines that content ID 457 is an allowed content ID for user ID 300 when the slice analysis information indicates that a decode threshold number of slices for content ID 457 are stored by user device 300. As another example, the processing module determines that content ID 505 is an allowed content ID for user ID 300 when the slice analysis information indicates that user ID 300 possesses a content license for content ID 505. As yet another example, the processing module determines that content ID 739 is an allowed content ID for user ID 300 when the permissions table lookup indicates that user ID 300 is allowed to possess content ID 739.

The method continues at step 138 where the processing module updates a user record to include at least a portion of the slice analysis information and the allowed content ID. The user record includes authentication information utilized in authenticating dispersed storage network (DSN) resource requests. For example, the processing module updates the user record to include an indication of which pillars of allowed content are stored at the user device and which pillars of the allowed content are allowable as an allowed combination. The allowed combination include an allowable subset of pillars of each data segment of a plurality of data segments of the allowed content, wherein the allowable subset of pillars is at least a decode threshold number and a most a pillar width number. The allowable subset of pillars may include a different subset of pillars for each data segment of the plurality of data segments. The allowed pillar combination may be determined by a pillar assignment method such that each user device is associated with a unique allowed pillar combination. Alternatively, the pillar assignment method may produce allowed pillar combinations that are shared amongst a predetermined number of user devices.

In an authenticating a DSN resource request example of operation, the processing module receives a content request from a user device, wherein the request includes a content ID and a user ID. The processing module accesses the user record based on the user ID. The processing module utilizes the user record for the user ID to determine whether the user device is allowed to access the content.

Figure 8A:
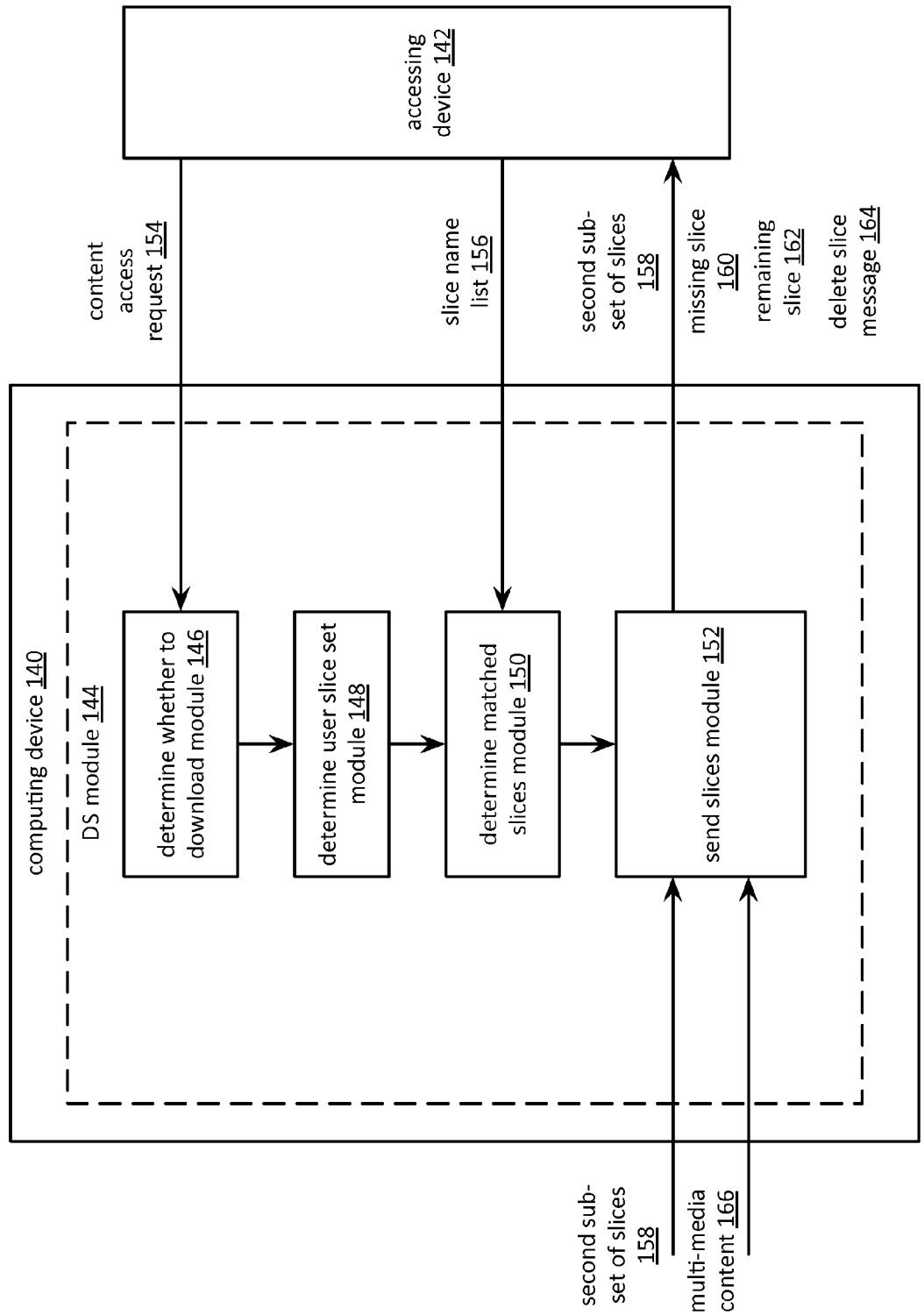
FIG. 8A is a schematic block diagram of another embodiment of a computing system in accordance with the present invention.

FIG. 8A is a schematic block diagram of another embodiment of a computing system that includes a computing device 140 and an accessing device 142. The computing device 140 may be implemented as a dispersed storage (DS) processing unit, a user device, and/or a DS unit. The accessing device 142 may be implemented as a user device, a DS unit, and/or another DS processing unit. For example, the computing device 140 is a DS processing unit commissioned to distribute multi-media content 166 to a user device as the accessing device 142. The computing device 140 includes a DS module 144 which includes a determine whether to download module 146, a determine user slice set module 148, a determine matched slices module 150, and a send slices module 152.

The accessing device 142 receives, during a pre-download process of the multi-media content 166, a partial set of encoded data slices of a set of encoded data slices produced by dispersed storage error encoding a data segment of the multi-media content 166. The determine whether to download module 146 determines whether to complete downloading of the data segment to the accessing device 142. The determining whether to complete downloading of the data segment includes polling the accessing device regarding accessing the multi-media content 166, receiving a content request 154 from the accessing device, and/or identifying a downloading schedule associated with the accessing device.

The determine user slice set module 148 determines, for the accessing device, a user set of encoded data slices, which includes first and second sub-sets of encoded data slices of the set of encoded data slices such that the first sub-set of encoded data slices includes less than a decode threshold number of encoded data slices. The first and second sub-sets of encoded data slices may include less encoded data slices than the set of encoded data slices. The determine user slice set module 148 may determine the user set of encoded data slices by accessing an authorized accessing list for the multi-media content 166.

The determine matched slices module 150 determines whether encoded data slices of the partial set of encoded data slices substantially matches encoded data slices of the first sub-set of encoded data slices. The determine matched slices module 150 determines whether the encoded data slices of the partial set of encoded data slices substantially matches the encoded data slices of the first sub-set of encoded data slices by obtaining a slice name list 156 that includes slice names of encoded data slices in the partial set of encoded data slices and comparing the slice name list 156 to slice names of the first sub-set of encoded data slices. The determine matched slices module 150 obtains the slice name list 156 by receiving the slice name list 156 and/or requesting the slice name list 156. The requesting the slice name list 156 includes issuing, to the accessing device, a slice name list request regarding the partial set of encoded data slices and receiving the slice name list 156.

When the comparing the slice name list 156 to slice names of the first sub-set of encoded data slices indicates that the encoded data slices of the partial set of encoded data slices substantially matches encoded data slices of the first sub-set of encoded data slices, the send slices module 152 sends the second sub-set of encoded data slices to the accessing device 142. For example, the send slices module 152 retrieves the second sub-set of encoded data slices 158 from a dispersed storage network (DSN) memory and outputs the second sub-set of encoded data slices 158 to the accessing device 142. As another example, some slices module 152 encodes the data segment of the multi-media content 166 utilizing a dispersed storage error coding function to produce the second sub-set encoded data slices 158 and outputs the second sub-so encoded data slices 158 to the accessing device 142.

When the encoded data slice of the partial set of encoded data slices does not substantially match encoded data slices of the first sub-set of encoded data slices, the determine matched slices module 150 determines whether the partial set of encoded data slices includes an encoded data slice that is not part of the first sub-set of encoded data slices (e.g., not part when a slice name of the encoded data slice does not match any slice name of the first sub-set of encoded data slices). When the partial set of encoded data slices does not include the encoded data slice the determine matched slices module 150 determines a missing encoded data slice 160 based on a comparison of the partial set of encoded data slices and the first sub-set of encoded data slices and the send slices module 152 sends the missing encoded data slice 160 and the second sub-set of encoded data slices 158 to the accessing device 142.

When the partial set of encoded data slices includes the encoded data slice that is not part of the first sub-set of encoded data slices, the determine matched slices module 150 determines a course of action for the downloading. The course of action includes sending remaining encoded data slices 162 of the second sub-set of encoded data slices 158, sending a message 164 to delete the encoded data slice that is not part of the first sub-sub encoded data slices, and/or sending a delete message 164 regarding the partial set of encoded data slices. For example, the determine matched slices module 150 determines the course of action based on determining whether the encoded data slice that is not part of the first sub-set of encoded data slices is part of the second sub-set of encoded data slices 158 (e.g., comparing slice names). When the encoded data slice that is not part of the first sub-set of encoded data slices is part of the second sub-set of encoded data slices 158, the send slices module 152 sends remaining encoded data slices 162 of the second sub-set of encoded data slices 158. When the encoded data slice that is not part of the first sub-set of encoded data slices is not part of the second sub-set of encoded data slices 158, the send slices module 152 sends the second sub-set of encoded data slices 158 and sends a message 164 to delete the encoded data slice that is not part of the first sub-set of encoded data slices.

As another example, the send slices module 152 determines the course of action as sending a delete message 164 regarding the partial set of encoded data slices based on a slice name of the encoded data slice that is not part of the first sub-set of encoded data slices. For instance, the send slices module 152 sends the delete message 164 regarding the partial set of encoded data slices when the encoded data slice that is not part of the first sub-set of encoded data slices is not part of the second sub-sub encoded data slices 158 and is part of the set of encoded data slices.

As yet another example, the send slices module 152 determines the course of action based on determining how the encoded data slice that is not part of the first sub-set of encoded data slices was obtained by the accessing device. When the encoded data slice that is not part of the first sub-set of encoded data slices was obtained in an authorized manner, the send slices module 152 sends the second sub-set of encoded data slices 158 to the accessing device 142. When the encoded data slice that is not part of the first sub-set of encoded data slices was obtained in an unauthorized manner, the send slices module 152 sends the delete message 164 regarding the partial set of encoded data slices.

Figure 8B:
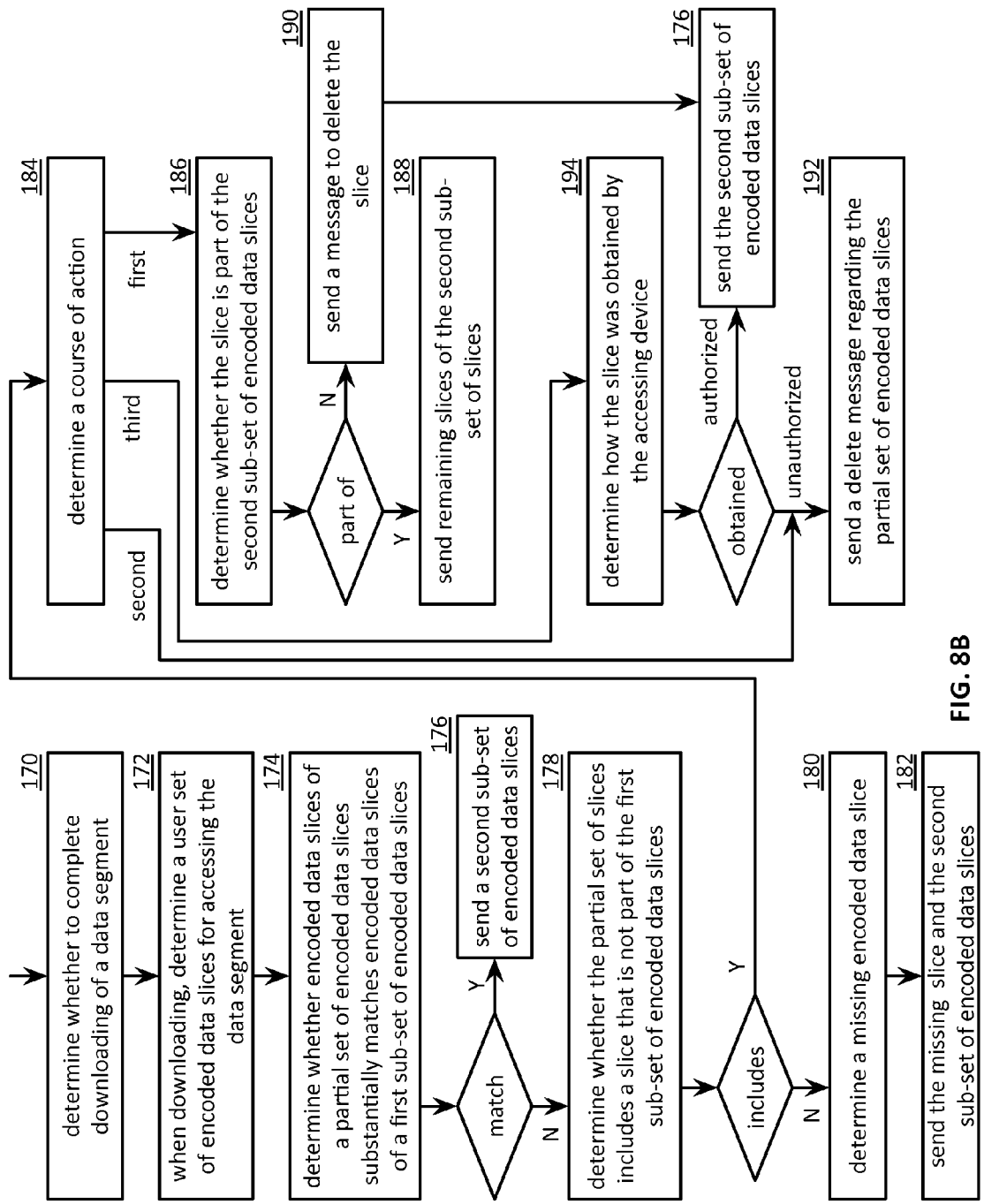
FIG. 8B is a flowchart illustrating an example of completing a content download in accordance with the present invention.

FIG. 8B is a flowchart illustrating an example of completing a content download. The method begins at step 170 where a processing module (e.g., of a dispersed storage (DS) processing unit) determines whether to complete downloading of a data segment of multi-media content to an accessing device. The data segment is encoded utilizing a dispersed storage error coding function to produce a set of encoded data slices and the accessing device receives a partial set of encoded data slices of the set of encoded data slices during a pre-download process of the multimedia content.

When the downloading is to be completed, the method continues at step 172 where the processing module determines, for the accessing device, a user set of encoded data slices for accessing the data segment. The user set of encoded data slices includes first and second sub-sets of encoded data slices of the set of encoded data slices. The first sub-set of encoded data slices includes less than a decode threshold number of encoded data slices. The first and second sub-sets of encoded data slices may include less encoded data slices than the set of encoded data slices. The determining includes accessing an authorized accessing list for the multi-media content.

The method continues at step 174 where the processing module determines whether encoded data slices of the partial set of encoded data slices substantially matches encoded data slices of the first sub-set of encoded data slices. The determining includes issuing, to the accessing device, a slice name list request regarding the partial set of encoded data slices and receiving a slice name list that includes slice names of the encoded data slices in the partial set of encoded data slices. The method branches to step 178 when there is no match. The method continues to step 176 when there is a match. The method continues at step 176 where the processing module sends the second sub-set of encoded data slices to the accessing device. The sending includes obtaining the second sub-set of encoded data slices to include generating the second sub-set of encoded data slices and/or retrieving the second sub-set of encoded data slices.

The method continues at step 178 where the processing module determines whether the partial set of encoded data slices includes an encoded data slice that is not part of the first sub-set of encoded data slices. The method branches to step 184 when the partial set of encoded data slices includes the encoded data slice that is not part of the first sub-sub encoded data slices. The method continues to step 180 when the partial set of encoded data slices does not include the encoded data slice that is not part of the first sub-sub encoded data slices. The method continues at step 180 where the processing module determines a missing encoded data slice (e.g., of the first sub-set of encoded data slices) based on a comparison of the partial set of encoded data slices and the first sub-set of encoded data slices. The method continues at step 182 where the processing module sends the missing encoded data slice and the second sub-set of encoded data slices to the accessing device.

The method continues at step 184 where the processing module determines a course of action for the downloading when the partial set of encoded data slices includes the encoded data slice that is not part of the first sub-set of encoded data slices. Such a course of action includes at least one of the first course of action, a second course of action, and a third course of action. The determining of the course of action includes selecting at least one of the first, second, and third course of action and may be based on one or more of a security concern level, an authorization level of the accessing device, and the partial set of encoded data slices. For example, the processing module selects the first course of action to align with a strategic objective to supply the second sub-set of encoded data slices to the accessing device when security issues are of a lesser concern. As another example, the processing module selects the second course of action to align with a strategic objective to interrupt the downloading of the data segment one security issues are of a greatest concern. As yet another example, the processing module selects the third course of action to align with a strategic objective to complete the download in accordance with an authorization level of the accessing device.

When the processing module selects the first course of action, the method continues at step 186 where the processing module determines whether the encoded data slice that is not part of the first sub-set of encoded data slices is part of the second sub-set of encoded data slices. The method branches to step 190 when the processing module determines that the encoded data slice is not part of the second sub-set of encoded slices. The method continues to step 188 when the processing module determines that the encoded data slice is part of the second sub-set of encoded slices. The method continues at step 188 where the processing module sends remaining encoded data slices of the second sub-set of encoded data slices to the accessing device.

When the encoded data slices that is not part of the first sub-set of encoded data slices is not part of the second sub-set of encoded data slices, the method continues at step 190 where the processing module sends a message to delete the encoded data slice that is not part of the first sub-set of encoded data slices. The method branches to step 176 where the processing module sends the second sub-set of encoded data slices to the accessing device.

When the processing module selects the second course of action, the method continues at step 192 where the processing module sends a delete message regarding the partial set of encoded data slices to the accessing device to facilitate deletion of the partial set of encoded data slices. When the processing module selects the third course of action, the method continues at step 194 where the processing module determines how the encoded data slice that is not part of the first sub-set of encoded data slices was obtained by the accessing device. The determining includes at least one of issuing a query to the accessing device, retrieving a slice transfer logging record, issuing a query to another accessing device, identifying a revision number associated with the encoded data slice, and retrieving the encoded data slice to extract a watermark. The obtaining of the encoded data slice by the accessing device includes an authorized manner and an unauthorized manner. For example, the processing module identifies the authorized manner when the revision number compares favorably to a list of authorized revision numbers in accordance with a content purchase agreement for the accessing device. As another example, the processing module identifies the unauthorized manner when the slice transfer logging record indicates that the accessing device received the encoded data slice from an unauthorized source.

When the encoded data slice that is not part of the first sub-set of encoded data slices was obtained in an authorized manner, the method branches to step 176 where the processing module sends the second sub-set of encoded data slices to the accessing device. When the encoded data slices that is not part of the first sub-set of encoded data slices was obtained in an unauthorized manner, the method continues to step 192 where the processing module sends the delete message regarding the partial set of encoded data slices to the accessing device.

Figure 9:
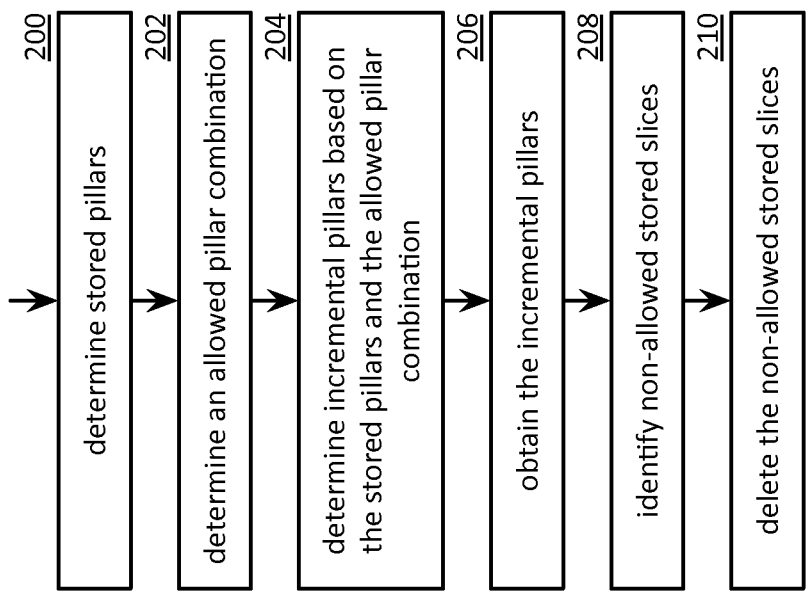
FIG. 9 is a flowchart illustrating another example of completing a content download in accordance with the present invention.

FIG. 9 is a flowchart illustrating another example of completing a content download. The method begins at step 200 where a processing module (e.g., of a user device) determines stored pillars. The stored pillars indicate which pillars of slices that the user device already possesses (e.g., from a previous download process). At least some of the stored pillars may not be included in an allowed pillar combination. The determination may be based on one or more of a query, a user record lookup, and slice analysis information of the user device. For example, the processing module determines that pillars 1 and 3 are included in the stored pillars when the slice analysis information indicates that pillars 1 in 3 are stored at the user device.

The method continues at step 202 where the processing module determines an allowed pillar combination. The determination may be based on one or more of assigning a new allowed pillar combination from a plurality of unassigned allowed pillar combinations, a user record lookup, and slice analysis information associated with the user device. For example, the processing module assigns an allowed pillar combination that includes pillars 1, 3, and 4 when a pillar width is 5 and a decode threshold is 3. There are 10 ways to choose 3 pillars from 5. Note that there are many more ways to choose a decode threshold number of pillars from a pillar width number of pillars when the difference between the decode threshold in the pillar width is larger. For example, there are 8,008 ways to choose 10 pillars from 16 enabling 8,008 user devices to be assigned a unique allowed pillar combination. As another example, there are over 64 million ways to choose 10 pillars from 32 enabling over 64 million user devices to be assigned a unique allowed pillar combination.

The method continues at step 204 where the processing module determines incremental pillars based on the stored pillars and the allowed pillar combination. The incremental pillars include pillars of the allowed pillar combination that are not already stored in the user device. For example, the processing module determines the incremental pillars to include pillar 4 when pillars 1, 3, and 4 are the allowed pillars and pillars 1 and 3 are the stored pillars.

The method continues at step 206 where the processing module obtains the incremental pillars. The obtaining includes at least one of requesting the incremental pillars and receiving the incremental pillars. The method continues at step 208 where the processing module identifies non-allowed stored slices. The non-allowed stored slices includes slices of pillars that are not included in the allowed pillar combination. The identifying may be based on comparing the stored pillars to the allowed pillar combination. For example, the processing module identifies slices of pillar 15 as non-allowed stored slices when the stored pillars includes pillars 1-8, and 15 and the allowed pillar combination includes pillars 1-12.

The method continues at step 210 where the processing module deletes the non-allowed stored slices. The deleting includes deleting the slices from a slice memory and sending a delete request (e.g., to a dispersed storage network memory). For example, the processing module deletes the slices of pillar 15 from a slice memory of a user device when the slices of pillar 15 are included in the non-allowed stored slices.

Figure 10:
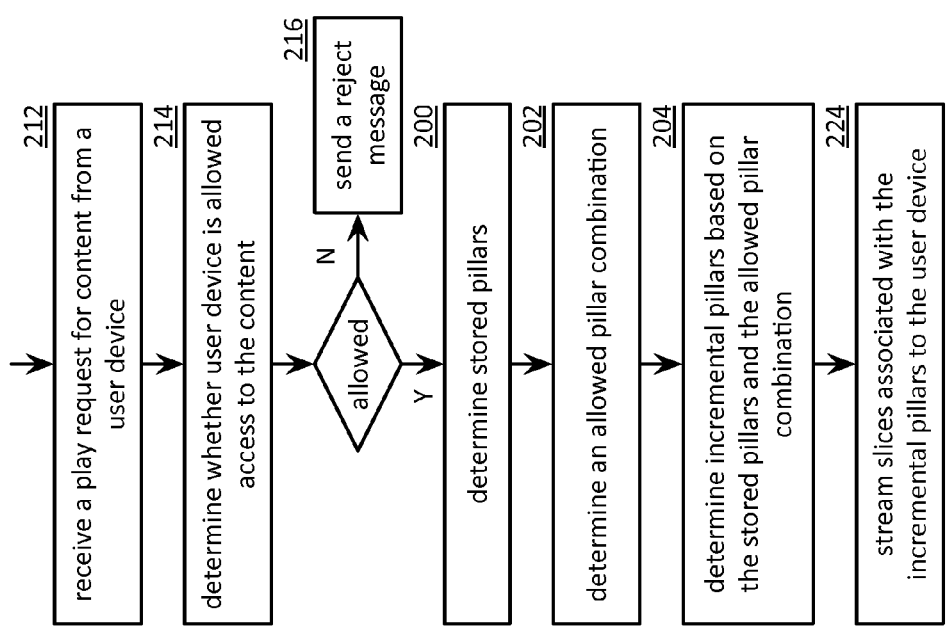
FIG. 10 is a flowchart illustrating another example of completing a content download in accordance with the present invention.

FIG. 10 is a flowchart illustrating another example of completing a content download, which include similar steps to FIG. 9. The method begins with step 212 where a processing module (e.g., of a dispersed storage (DS) processing unit) receives a play request for content from a user device. The play request includes one or more of a user device identifier (ID) and a content ID. The method continues at step 214 where the processing module determines whether the user device is allowed to access the content. The determining is based on at least one of a user record lookup, utilizing the user device ID, and slice analysis information. For example, the processing module determines that the user device is allowed to access the content when the user record lookup indicates that the user device has permission to access content. As another example, the processing module determines that the user device is allowed to access the content when the slice analysis information indicates that the user device includes a license to access the content.

The method branches to step 200 FIG. 9 where when the processing module determines that the user device is allowed to access the content. The method continues to step 216 when the processing module determines that the user device is not allowed to access the content. The method continues at step 216 where the processing module sends a reject message (e.g., to one or more of the user device and a DS managing unit). The reject message may include one or more of a reject indicator, a rejection reason indicator, the user ID, and the content ID.

When the user device is allowed to access the content, the method continues with the steps of FIG. 9 where the processing module determines stored pillars, determines an allowed pillar combination, and determines incremental pillars based on the stored pillars and the allowed pillar combination. The method continues at step 224 where the processing module streams slices associated with the incremental pillars to the user device. The streaming includes sending slices of the incremental pillars segment by segment in an order starting with a first segment. The slices of incremental pillars may vary in pillar number segment by segment.

Figure 11A:
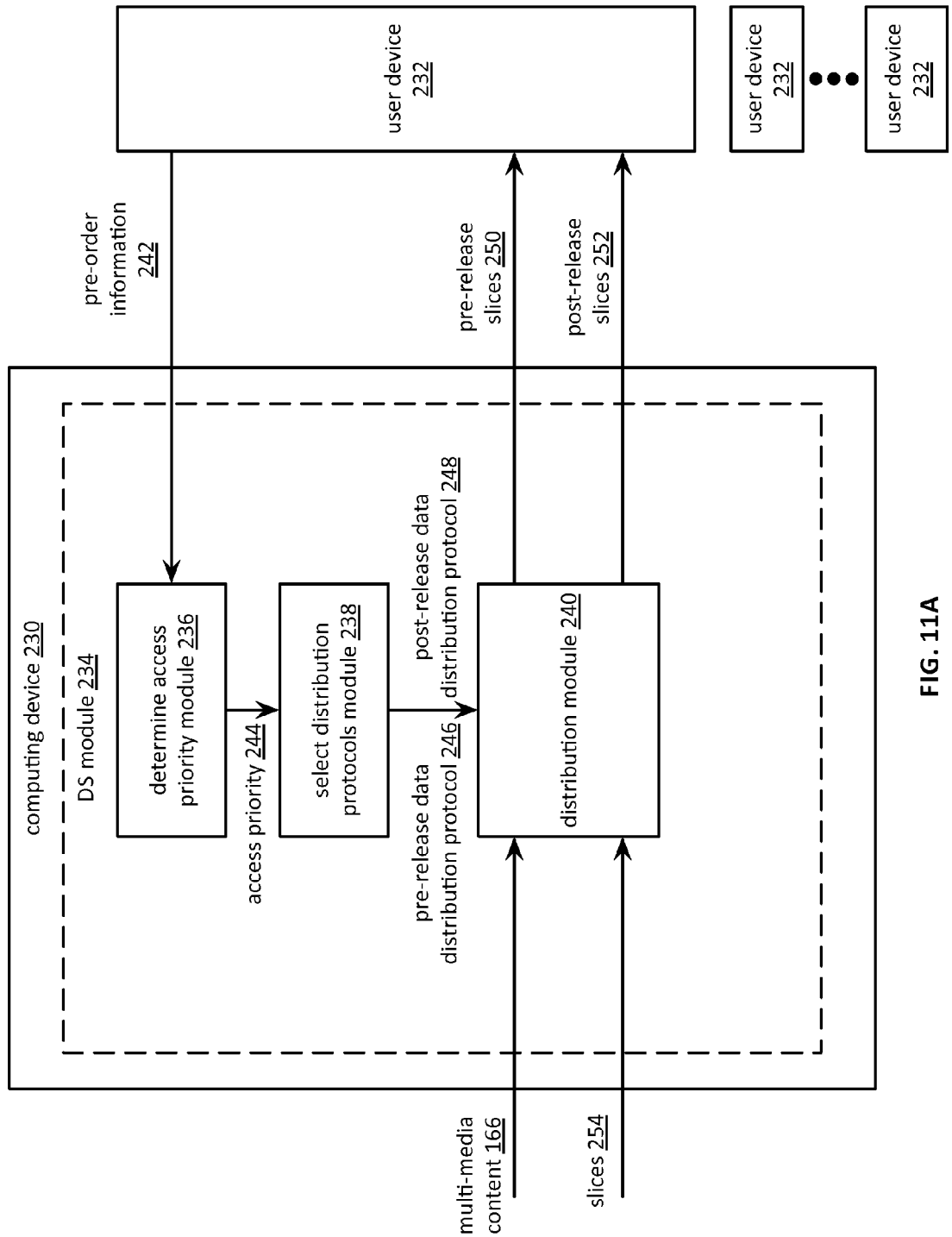
FIG. 11A is a schematic block diagram of another embodiment of a computing system in accordance with the present invention.

FIG. 11A is a schematic block diagram of another embodiment of a computing system that includes a computing device 230 and plurality of user devices 232. The computing device 230 may be implemented as a dispersed storage (DS) processing unit, a user device, and/or a DS unit. The computing device 230 may distribute multi-media content 166 to the plurality of user devices 232 in accordance with release of the multi-media content 166 for distribution. For example, the computing device 230 is a DS processing unit commissioned to distribute a first portion of the multi-media content 166 to a user device 232 prior to release of the multi-media content 166 and to distribute a second portion of the multi-media content 166 to the user device 232 subsequent to release of the multi-media content 166. The computing device 230 includes a DS module 234 which includes a determine access priority module 236, a select distribution protocols module 238, and a distribution module 240.

The determine access priority module 236 determines, for multi-media content 166 that has not been released, access priority 244 for the user device 232 utilizing a first or second approach. In a first approach to determine access priority, the determine access priority module 236 determines the access priority 244 by interpreting pre-order information 242 of the user device 232 to identify a priority level of access to the multi-media content. For example, the determine access priority module 236 interprets an active subscription to identify a medium priority level of access. As another example, the determine access priority module 236 interprets a pre-purchase order to identify a low priority level of access. As yet another example, the determine access priority module 236 interprets a premium purchase order to identify a high priority level of access. The priority level of access includes two or more of a data reliability indication (e.g., low, medium, high, etc.), a data resolution indication (e.g., low, medium, high, etc.), an availability indicator (e.g., as soon as possible when released, within a day, for lowest cost), a distribution cost indicator (e.g., willingness to pay a premium, a lowest-cost utilization indication), and a storage indicator (e.g., how much memory is available for the download).

The access priority 244 includes a pre-release access priority and a post-release access priority. For example, the pre-release access priority includes a low priority level of access when a distribution cost indicator indicates to utilize a lowest-cost approach. As another example, the post-release access party level includes a high priority level of access when an availability indicator identifies a fastest availability as soon as the multi-media content 166 is released.

In a second approach to determine access priority, the determine access priority module 236 determines the access priority 244 by identifying the user device 232 as having a maintenance program for purchased multi-media content which includes an update to the purchased multi-media content. For example, the determine access priority module 236 identifies the user device 232 to be associated with a purchase of all future revisions of the multi-media content 166 based on a purchase list lookup.

The select distribution protocols module 238 selects a pre-release data distribution protocol based on the access priority 244 to produce a selected pre-release data distribution protocol 246 and selects a post-release data distribution protocol based on the access priority 244 to produce a selected post-release data distribution protocol 248. The select distribution protocols module 238 selects the pre-release data distribution protocol based on the pre-release access priority and selects the post-release data distribution protocol based on the post-release access priority.

The pre-release data distribution protocol 246 includes two or more of a number of encoded data slices to include in the first pre-release sub-set (e.g., more slices per set for a higher access level and fewer for a lower access level), a time frame for sending the plurality of pre-release sub-sets to the user device (e.g., overnight, right away, a fixed period of time later, after the release), a network connection preference to the user device (e.g., lowest cost connectivity, highest bandwidth connectivity), and an assurance level of the user device receiving the plurality of pre-release sub-sets prior to the release of the multi-media content. The post-release data distribution protocol 248 includes two or more of a number of encoded data slices to include in the first post-release sub-set (e.g., more slices per set for a higher access level and fewer for a lower access level), a time frame for sending the plurality of post-release sub-sets to the user device (e.g., right away for a premium purchase, a fixed period of time later for an economy purchase, aligned with a time of consumption), a network connection preference to the user device (e.g., higher bandwidth for a premium purchase), and an assurance level of the user device receiving the plurality of post-release sub-sets in a given time frame subsequent to the release of the multi-media content.

The distribution module 240 distributes pre-release sub-sets of encoded data slices 250 to the user device in accordance with the selected pre-release data distribution protocol 246. The multi-media content 166 is dispersed storage error encoded to produce sets of encoded data slices 254 which includes the pre-release sub-sets of encoded data slices 250. Each pre-release sub-set includes less than a decode threshold number of encoded data slices of a set of encoded data slices. The distributing includes at least one of generating the sets of encoded data slices 254, retrieving the sets of encoded data slices 254 (e.g., from a dispersed storage network memory), and selecting the pre-release sub-sets of encoded data slices 250 in accordance with the selected pre-release data distribution protocol 246. For example, the distribution module 240 selects 9 encoded data slices of each set of encoded data slices 254 to produce the pre-release sub-sets of encoded data slices 250 when the decode threshold number is 10 and the selected pre-release data distribution protocol 246 indicates to include a maximum number of encoded data slices for pre-distribution.

Subsequent to release of the multi-media content 166, the distribution module 240 distributes post-release sub-sets of encoded data slices 252 to the user device in accordance with the selected post-release data distribution protocol 248. Each post-release sub-set includes one or more encoded data slices of the set of encoded data slices such that a first pre-release sub-set and a first post-release sub-set includes at least the decode threshold number of encoded data slices of the set of encoded data slices. The distributing includes at least one of generating the sets of encoded data slices 254, retrieving the sets of encoded data slices 254, and selecting the post-release sub-sets of encoded data slices 252 in accordance with the selected post-release data distribution protocol 248. For example, the distribution module 240 selects 3 encoded data slices of each set of encoded data slices 254 to produce the post-release sub-sets of encoded data slices 252 when the decode threshold number is ten, nine slices per set were selected for the pre-release sub-sets of encoded data slices, and the selected post-release data distribution protocol 248 indicates to include two more encoded data slices than the decode threshold number for post-distribution.

Figure 11B:
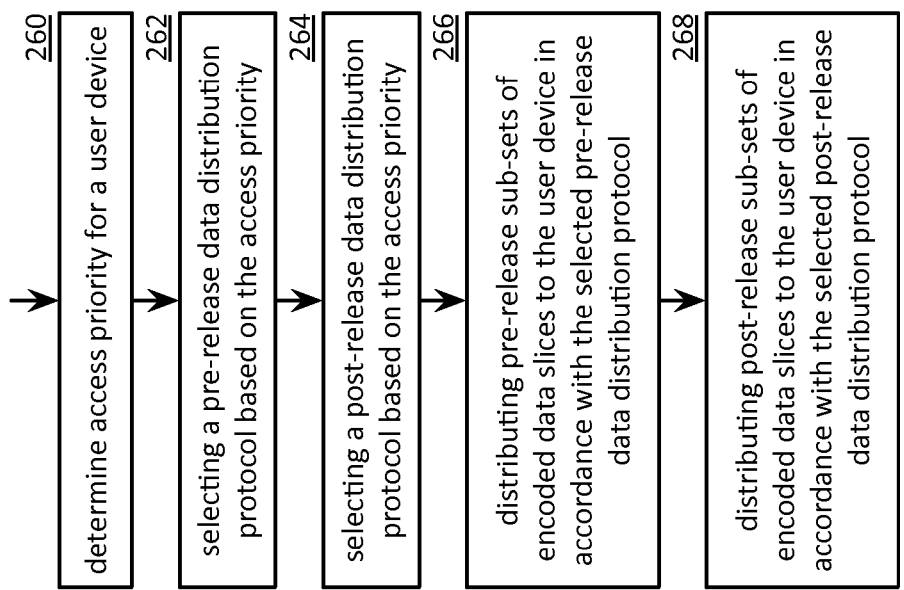
FIG. 11B is a flowchart illustrating an example of distributing content in accordance with the present invention.

FIG. 11B is a flowchart illustrating an example of distributing content. The method begins at step 260 where a processing module (e.g., of a dispersed storage (DS) processing unit) determines, for multi-media content that has not been released, access priority for a user device. The access priority including a pre-release access priority and a post-release access priority. The determining the access priority includes at least one of interpreting pre-order information of the user device to identify one of a plurality of priority levels of access to the multi-media content and identifying the user device as having a maintenance program for purchased multi-media content, wherein the multi-media content is an update to the purchased multi-media content.

The method continues at step 262 where the processing module selects one of a plurality of pre-release data distribution protocols based on the access priority to produce a selected pre-release data distribution protocol. The selecting includes selecting the one of the plurality of pre-release data distribution protocols based on the pre-release access priority. The plurality of pre-release data distribution protocols includes two or more of a number of encoded data slices to include in the first pre-release sub-set, a time frame for sending the plurality of pre-release sub-sets to the user device, a network connection preference to the user device, and an assurance level of the user device receiving the plurality of pre-release sub-sets prior to the release of the multi-media content.

The method continues at step 264 where the processing module selects one of a plurality of post-release data distribution protocols based on the access priority to produce a selected post-release data distribution protocol. The selecting includes selecting the one of the plurality of post-release data distribution protocols based on the post-release access priority. The plurality of post-release data distribution protocols includes two or more of a number of encoded data slices to include in the first post-release sub-set, a time frame for sending the plurality of post-release sub-sets to the user device, a network connection preference to the user device, and an assurance level of the user device receiving the plurality of post-release sub-sets in a given time frame subsequent to the release of the multi-media content.

The method continues at step 266 where the processing module distributes a plurality of pre-release sub-sets of a plurality of sets of encoded data slices to the user device in accordance with the selected pre-release data distribution protocol. The distributing may include dispersed storage error encoding the multi-media content to produce the plurality of sets of encoded data slices. The first pre-release sub-set of the plurality of pre-release sub-sets may include less than a decode threshold number of encoded data slices of a set of encoded data slices of the plurality of sets of encoded data slices.

Subsequent to release of the multi-media content, the method continues at step 268 where the processing module distributes a plurality of post-release sub-sets of the plurality of sets of encoded data slices to the user device in accordance with the selected post-release data distribution protocol. A first post-release sub-set of the plurality of post-release sub-sets includes one or more encoded data slices of the set of encoded data slices such that the first pre-release sub-set and the first post-release sub-set includes at least a decode threshold number of encoded data slices of the set of encoded data slices.

Figure 12A:
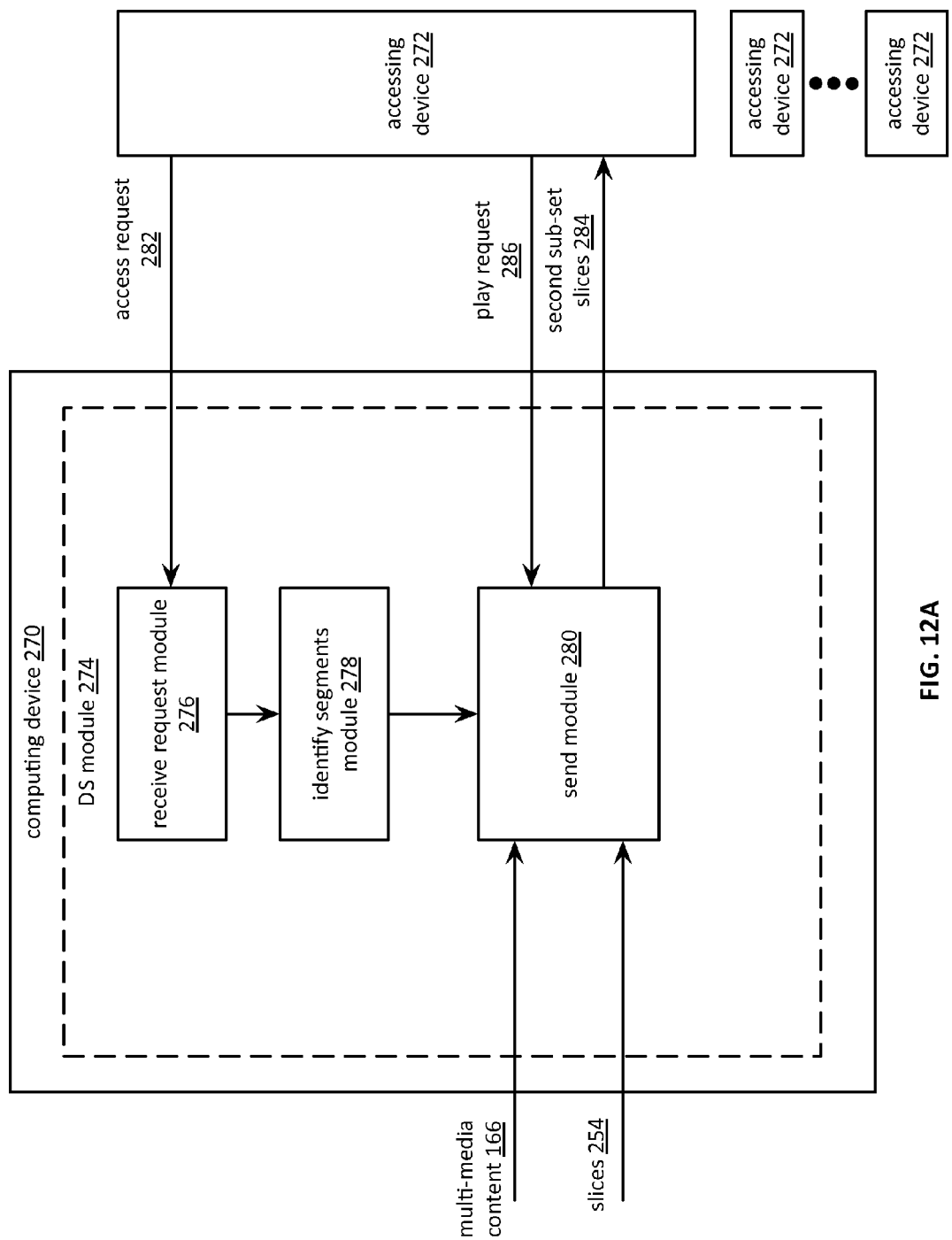
FIG. 12A is a schematic block diagram of another embodiment of a computing system in accordance with the present invention.

FIG. 12A is a schematic block diagram of another embodiment of a computing system that includes a computing device 270 and plurality of accessing devices 272. The computing device 270 may be implemented as a dispersed storage (DS) processing unit, a user device, and/or a DS unit. The computing device 270 may distribute at least a portion of multi-media content 166 to the plurality of user devices 272 in accordance with a preview approach. For example, the computing device 270 is a DS processing unit commissioned to distribute a first portion of the multi-media content 166 to an accessing device 272 prior to purchase of the multi-media content 166 by the accessing device 272 and to distribute a customized preview of the multi-media content 166 to the accessing device 272. The computing device 270 includes a DS module 274 which includes a receive request module 276, an identify data segments module 278, and a send module 280.

The multi-media content 166 is divided into data segments and the data segments are encoded utilizing a dispersed storage error coding function to produce sets of encoded data slices. Each set of encoded data slices includes a first sub-set of encoded data slices and a second sub-set of encoded data slices. Each first sub-set of encoded data includes less than a decode threshold number of encoded data slices. The accessing device 272 possesses first sub-sets of encoded data slices.

The receive request module 276 receives an access request 282 for a customized preview of multi-media content 166 from the accessing device 272. The access request 282 includes at least one of a multi-media content identifier (ID) corresponding to the multi-media content 166, a preview ID corresponding to the customized preview of the multi-media content, a preview descriptor corresponding to the customized preview of the multi-media content (e.g., an actor name, a scene description, music verse, speech text, etc.), data segment IDs of a set of data segments corresponding to the customized preview, and one more slice names of at least one encoded data slice (e.g., indicating what is in possession by the accessing device).

The identify segments module 278 identifies the set of data segments corresponding to the customized preview of the multi-media content based on identity information of the accessing device. The identity information includes one or more of identity of the accessing device, identity of a style of previewing multi-media content, a request for the customized preview, and preview preference information. The identify segments module 278 may identify the set of data segments and a variety of ways. For example, the identify segments module 278 identifies the set of data segments by determining the customized preview based on the identity information and identifying the set of data slices corresponding to the customized preview. As an instance of the example, the identify segments module 278 selects a customized preview that includes scenes that include a particular actor when preview preference information corresponding to the identity of the accessing device indicates a preference for the particular actor. As another example, the identify segments module 278 identifies the set of data segments by interpreting the identity information to determine preview preference information, generate the customized preview based on the preview preference information, and identifying the set of data slices corresponding to the customized preview.

The send module 280 sends to the accessing device 272, at least one encoded data slice 284 of a second sub-set of encoded data slices that corresponds to a data segment of the set of data segments. The send module 280 sends the at least one encoded data slice 284 by obtaining the at least one encoded data slice 284 and outputting the at least one encoded data slice 284. The send module 280 obtains the at least one encoded data slice 284 by at least one of encoding the multi-media content 166 to generate the at least one encoded data slice 284 and retrieving slices 254 from a dispersed storage network memory that includes second sub-set encoded data slices.

The send module 280 outputs the at least one encoded data slice 284 to the accessing device 272 by at least one of a variety of ways. For example, the send module 280 generates viewing information and embeds the viewing information with the at least one encoded data slice 284. The viewing information includes one or more of number of allowed views, an expiration time of the at least one encoded data slice, a section identifier, segment identifiers corresponding to other segments of the plurality of segments. As another example, the send module 280 outputs the at least one encoded data slice 284 to the accessing device 272 when receiving a play request 286 from the accessing device 272. As yet another example, the send module 280 outputs the at least one encoded data slice 284 to the access device 272 in accordance with a multi-media streaming approach (e.g., pacing outputting of slices with real-time consumption).

The computing device 270 may process access requests from any of the plurality of accessing devices 272. For example, the receive request module 276 receives a second access request 282 for a second customized preview of the multi-media content from a second accessing device 272 and the identify segments module 278 identifies a second set of data segments corresponding to the second customized preview of the multi-media content based on second identity information of the second accessing device 272. Continuing with the preceding example, the send module 280 sends, to the second accessing device 272, at least one encoded data slice 284 of second sub-sets of encoded data slices that corresponds to a data segment of the second set of data segments.

Figure 12B:
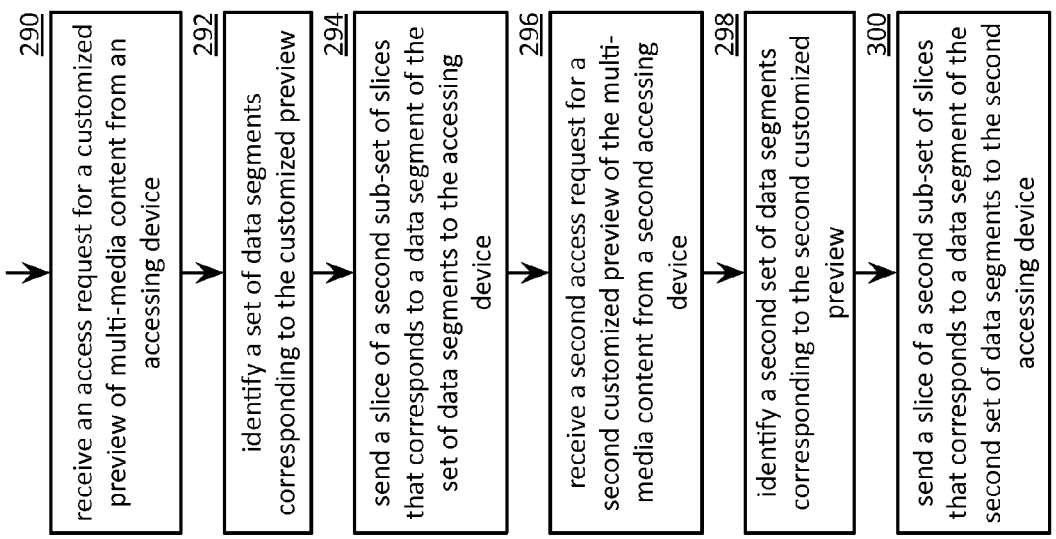
FIG. 12B is a flowchart illustrating an example of downloading content in accordance with the present invention.

FIG. 12B is a flowchart illustrating an example of downloading content. The method begins at step 290 where a processing module (e.g., a dispersed storage (DS) processing module) receives an access request for a customized preview of multi-media content from an accessing device. The multi-media content is divided into data segments and the data segments are encoded utilizing a dispersed storage error coding function to produce sets of encoded data slices. Each set of encoded data slices includes a first sub-set of encoded data slices and a second sub-set of encoded data slices. Each first sub-set of encoded data includes less than a decode threshold number of encoded data slices. The accessing device possesses first sub-sets of encoded data slices prior to issuing the access request.

The method continues at step 292 where the processing module identifies a set of data segments of the data segments corresponding to the customized preview of the multi-media content based on identity information of the accessing device. The processing module may identify the set of data segments in a variety of ways. For example, the processing module identifies the set of data segments by determining the customized preview based on the identity information and identifying the set of data slices corresponding to the customized preview. As another example, the processing module identifies the set of data segments by interpreting the identity information to determine preview preference information, generating the customized preview based on the preview preference information, and identifying the set of data slices corresponding to the customized preview.

The method continues at step 294 where the processing module sends, to the accessing device, at least one encoded data slice of a second sub-set of encoded data slices that corresponds to a data segment of the set of data segments. The sending the at least one encoded data slice to the accessing device further includes at least one of generating viewing information and embedding the viewing information with the at least one encoded data slice, outputting the at least one encoded data slice to the accessing device when receiving a play request from the accessing device, and outputting the at least one encoded data slice to the access device in accordance with a multi-media streaming approach.

The method continues at step 296 where the processing module receives a second access request for a second customized preview of the multi-media content from a second accessing device. The method continues at step 298 where the processing module identifies a second set of data segments of the data segments corresponding to the second customized preview of the multi-media content based on second identity information of the second accessing device. The method continues at step 300 where the processing module sends, to the second accessing device, at least one encoded data slice of one of the second sub-set of encoded data slices that corresponds to a data segment of the second set of data segments.

Figure 13:
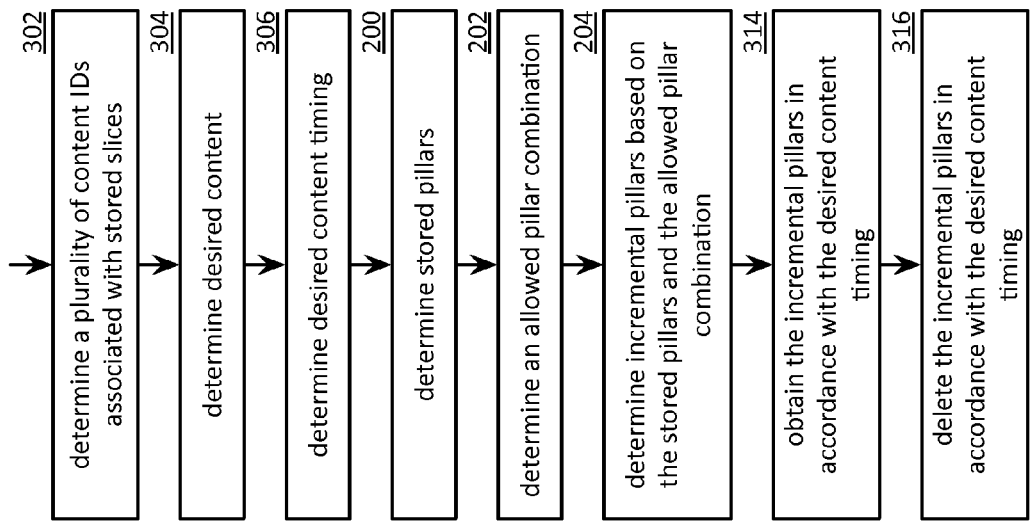
FIG. 13 is a flowchart illustrating another example of completing a content download in accordance with the present invention.

FIG. 13 is a flowchart illustrating another example of completing a content download, which includes similar steps to FIG. 9. The method begins with step 302 where a processing module (e.g., of a user device) determines a plurality of content identifiers (IDs) associated with stored slices. The determining may be based on one or more of a content list, searching a dispersed storage network (DSN) memory for storing slices associated with content, a data type indicator, a directory, a filename, and a filename extension. For example, the processing module determines the plurality of content IDs based on identifying filename extensions in a directory that include a movie indicator.

The method continues at step 304 where the processing module determines desired content. The determining may be based on one or more of identifying content IDs associated with most desirable content, a calendar event, a request, a consumption requirement, a previous consumption pattern, a preferred content list, a purchase content list, and a content wish list. For example, the processing module identifies the content ID associated with family pictures when a calendar event indicates that a family event is scheduled.

The method continues at step 306 where the processing module determines desired content timing. The desired content timing indicates a time window when the desired content shall be available for consumption. The determining may be based on one or more of the desired content, an estimate of time to download slices of incremental pillars, a calendar event, a user input, the previous consumption pattern, and a preferred timing list. For example, the processing module identifies the desired content timing as two hours prior to the family event indicated in the calendar event.

The method continues with steps 200, 202, and 204 of FIG. 9 where, for the desired content, the processing module determines stored pillars, determines an allowed pillar combination, and determines incremental pillars based on the stored pillars and the allowed pillar combination. The method continues at step 314 where the processing module obtains the incremental pillars in accordance with the desired content timing. The obtaining includes requesting slices associated with the incremental pillars and sending slice requests such that the slices associated with the incremental pillars are received in accordance with the desired content timing. For sample, the processing module sends slice requests one hour in advance of the family event and receives the slices associated with the incremental pillars prior to the family event. The method continues at step 316 where the processing module deletes the incremental pillars in accordance with the desired content timing. For example, the processing module deletes the slices associated with incremental pillars 24 hours after the family event ends.

FIG. 14A is a block diagram of an embodiment of a data storage structure which includes a database 320 that includes entries corresponding to data stored in a dispersed storage network (DSN) memory. Each entry includes a data name field 322, metadata field 324, a data dispersed storage network (DSN) address field 326, and a metadata DSN address field 328. For each entry of the database 320, the data name field 322 includes a data identifier (ID) corresponding to data associated with the entry. The data ID may be represented as one of more types including at least one of a file system path name, a content identifier (ID), a block number, and an object number. The metadata field 324 includes metadata corresponding to the data. The metadata includes one or more of a data revision indicator, a metadata revision indicator, a data size indicator, a data type indicator, a data hash digest, a security level indicator, an owner ID, data integrity information, a timestamp, a segment allocation table DSN address, and an access permission indicator. The data DSN address field 326 includes a DSN address corresponding to a storage location of the data within the DSN memory. The DSN address may include a source name and/or one or more sets of slice names. The metadata DSN address field 328 includes a DSN address corresponding to a storage location of the metadata within the DSN memory.

The database 320 may be stored in a local memory and/or in the DSN memory as encoded database slices. The database 320 may be utilized as an index to facilitate data access within the DSN memory. For example, a metadata DSN address is extracted from an entry of the database and corresponding metadata is retrieved from the DSN memory utilizing the metadata DSN address. The metadata is compared to a search criteria and a match may be indicated when the metadata compares favorably to the search criteria. When the match is indicated, a data DSN address is extracted from the entry of the database and utilized to recover data from the DSN memory.

FIG. 14B is a block diagram of an embodiment of a data storage system which includes a plurality of combiners 330, a plurality of encoders 332, a plurality of appenders 334, and a dispersed storage network (DSN) memory 22. The data storage system is operable to store data at a data DSN address 326 within the DSN memory 22 and to store metadata 324 of the data at a metadata DSN address 328 within the DSN memory 22. The storing of the data includes including the metadata DSN address 328 with the data and the storing of the metadata 324 includes including the data DSN address 326 with the metadata 324. The storing of the data and the metadata 324 may be accomplished utilizing at least two approaches.

In a first approach to store the data, combiner 330 combines a data segment 336 of the data with the metadata DSN address 328 to produce an amended data segment 338. For example, the data is segmented into a plurality of data segments that includes the data segment. A first data segment of the plurality of data segments is selected as the data segment 336 to be combined with the metadata DSN address 328 to produce the amended data segment 338. Continuing with the first approach, encoder 332 dispersed storage error encodes the amended data segment 338 to produce a set of data slices 340. Next, the set of data slices 340 are stored in the DSN memory 22.

In a first approach to store the metadata, combiner 330 combines metadata 324 with the data DSN address 326 to produce amended metadata 342. For example, the data is analyzed to produce the metadata 324 and the data DSN address 326 is appended to the beginning of the metadata 324 to produce the amended metadata 342. Continuing with the first approach, encoder 332 dispersed storage error encodes the amended metadata 342 to produce a set of metadata slices 344. Next, the set of metadata slices 344 are stored in the DSN memory 22.

In a second approach to store the data, encoder 332 dispersed storage error encodes the data segment 336 to produce a preliminary set of encoded data slices 346. Next, the appender 334 appends the metadata DSN address 328 with at least some of the encoded data slices of the preliminary set of encoded data slices 346 to produce a set of encoded data slices 348. For example, the appender 334 appends the metadata DSN address 328 to the end of a decode threshold number of encoded data slices of the preliminary set of encoded data slices 346 to produce the set of encoded data slices 348. Next, the set of encoded data slices 348 is stored in the DSN memory 22.

In a second approach to store the metadata, encoder 332 dispersed storage error encodes the metadata 324 to produce a preliminary set of encoded metadata slices 350. Next, the appender 334 appends the data DSN address 326 with at least some of the encoded metadata slices of the preliminary set of encoded metadata slices 250 to produce a set of encoded metadata slices 352. For example, the appender 334 appends the data DSN address 326 to the end of a decode threshold number of encoded metadata slices of the preliminary set of encoded metadata slices 350 to produce the set of encoded metadata slices 352. Next, the set of encoded metadata slices 352 is stored in the DSN memory 22. The approaches to store the data and the metadata 324 in the DSN memory 22 are discussed in greater detail of reference to FIGS. 15A, 15B, 15C, and 15D.

Figure 15A:
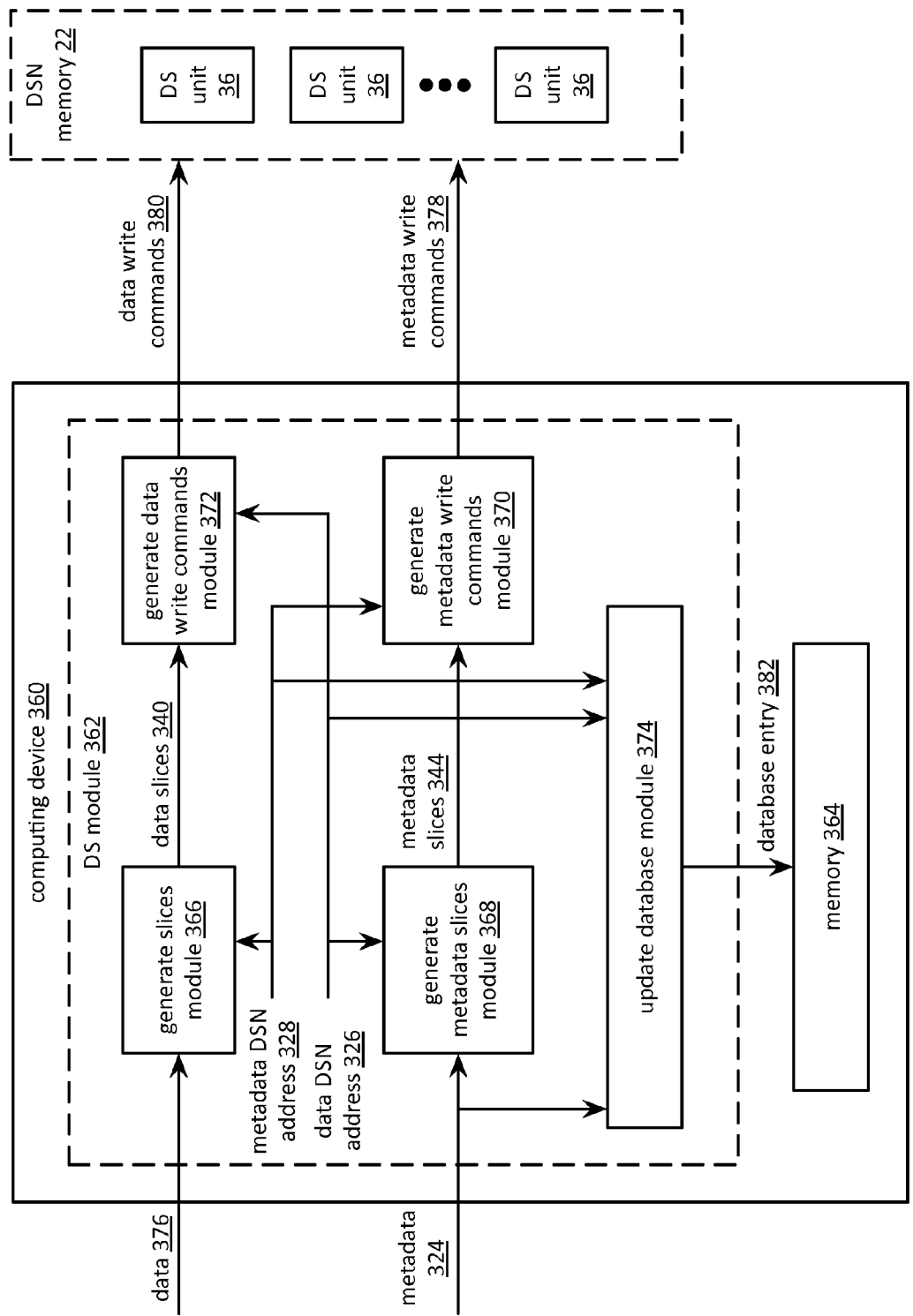
FIG. 15A is a schematic block diagram of another embodiment of a computing system in accordance with the present invention.

FIG. 15A is a schematic block diagram of another embodiment of a computing system that includes a computing device 360 and a dispersed storage network (DSN) memory 22. The DSN memory 22 includes one or more sets of dispersed storage (DS) units 36. The computing device 360 may be implemented as a dispersed storage (DS) processing unit, a user device, and/or a DS unit. The computing device 360 may store data 376 and metadata 324 of the data 376 in the DSN memory 22 in accordance with a storage approach. For example, the computing device 360 is a DS processing unit commissioned to receive data 376, generate metadata 324 of the data 376, store the data 376 in the DSN memory 22, and store the metadata 324 in the DSN memory 22. The computing device 360 includes a DS module 362 and memory 364. The DS module 362 includes a generate slices module 366, a generate metadata slices module 368, a generate metadata write commands module 370, a generate data write commands module 372, and an update database module 374.

The generate slices module 366 generates a set of encoded data slices 340 based on a data segment of the data 376 and DSN addressing information 328 regarding metadata 324 of the data 376. The DSN addressing information 328 regarding the metadata 324 includes at least one of a metadata source name and at least one set of metadata slice names. The generate slices module 366, the generate metadata slices module 368, and or the generate metadata write commands module 370 may include an obtain DSN addressing information function which causes the DS module 362 to obtain the DSN addressing information 328 regarding the metadata 324 in a variety of ways. For example, the obtaining includes, when a data name associated with the data 376 is a new data name, identifying a vault identifier (ID) associated with the data 376, accessing a vault utilizing the vault ID to retrieve dispersed storage error coding function parameters, and generating a metadata source name based on the vault ID and the dispersed storage error coding function parameters. As another example, the obtaining includes, when the data name associated with the data 376 is not a new data name, retrieving the metadata source name from a database of memory 364 utilizing the data name.

The generate slices module 366 may generate the set of encoded data slices 340 in utilizing a variety of approaches. In a first approach, the generate slices module 366 combines the DSN addressing information 328 regarding metadata 324 with a data segment of the data 376 to produce an amended data segment. Next, the generate slices module 366 dispersed storage error encodes the amended data segment to produce the set of encoded data slices 340. In a second approach, the generate slices module 366 dispersed storage error encodes the data segment to produce a preliminary set of encoded data slices. Next, the generate slices module 366 appends the DSN addressing information 328 regarding the metadata 324 with at least some of the encoded data slices of the preliminary set of encoded data slices to produce the set of encoded data slices 340.

The generate metadata slices module 368 generates a set of encoded metadata slices 344 based on the metadata 324 and DSN addressing information 326 regarding the data 376. The DSN addressing information 326 regarding the data 376 includes at least one of a data source name and at least one set of data slice names. The generate slices module 366, the generate metadata slices module 368, and or the generate data write commands module 372 may include another obtain DSN addressing information function which causes the DS module 362 to obtain the DSN addressing information 326 regarding the data 376 in a variety of ways. For example, the obtaining includes identifying the vault identifier (ID) associated with the data 376, accessing the vault utilizing the vault ID to retrieve the dispersed storage error coding function parameters, and generating a data source name based on the vault ID and the dispersed storage error coding function parameters.

The generate metadata slices module 368 may generate the set of encoded metadata slices 344 in utilizing a variety of approaches. In a first approach, the generate slices module 368 combines the DSN addressing information 326 regarding data 376 with the metadata 324 to produce amended metadata. Next, the generate metadata slices module 368 dispersed storage error encodes the amended metadata segment to produce the set of encoded metadata slices 344. In a second approach, the generate metadata slices module 368 dispersed storage error encodes the metadata 324 to produce a preliminary set of encoded metadata slices. Next, the generate slices module 368 appends the DSN addressing information 326 regarding the data 376 with at least some of the encoded metadata slices of the preliminary set of encoded metadata slices to produce the set of encoded metadata slices 344.

The generate metadata write commands module 370 generates a set of metadata write commands 378 regarding storing the set of encoded metadata slices 344 in a first set of DS units 36 of the DSN memory 22. For example, the generate metadata write commands module 370 generates a set of write slice requests that includes the set of encoded metadata slices 344 and is targeted for sending to the first set of DS units 36. Next, the computing device 360 sends the set of write slice requests that includes the set of encoded metadata slices 344 to the first set of DS units 36.

The generate data write commands module 372 module generates a set of data segment write commands 380 regarding storing the set of encoded data slices 340 in a second set of DS units 36 of the DSN memory 22. For example, the generate data write commands module 372 generates a set of write slice requests that includes the set of encoded data slices 340 and is targeted for sending to the second set of DS units 36. The first set of DS units 36 may be substantially the same as the second set of DS units 36. Next, the computing device 360 sends the set of write slice requests that includes the set of encoded data slices 340 to the second of set of DS units 36.

The update database module 374 generates a database entry 382 to include one or more of a data name of the data 376, the metadata 324, the DSN addressing information regarding 328 the metadata 324, and DSN addressing information 326 regarding the data 376 and updates the database to include the database entry 382. The update database module 374 may update the database in a variety of ways including one or more of retrieving at least a portion of the database from one of the DSN memory 22 and the memory 364, appending the database entry 382 to the at least the portion of the database to produce an updated database portion, overwriting a previous database entry corresponding to the data name with the database entry 382 to produce the updated database portion, and facilitating storage of the updated database portion in at least one of the memory 383 and the DSN memory 22.

Figure 15B:
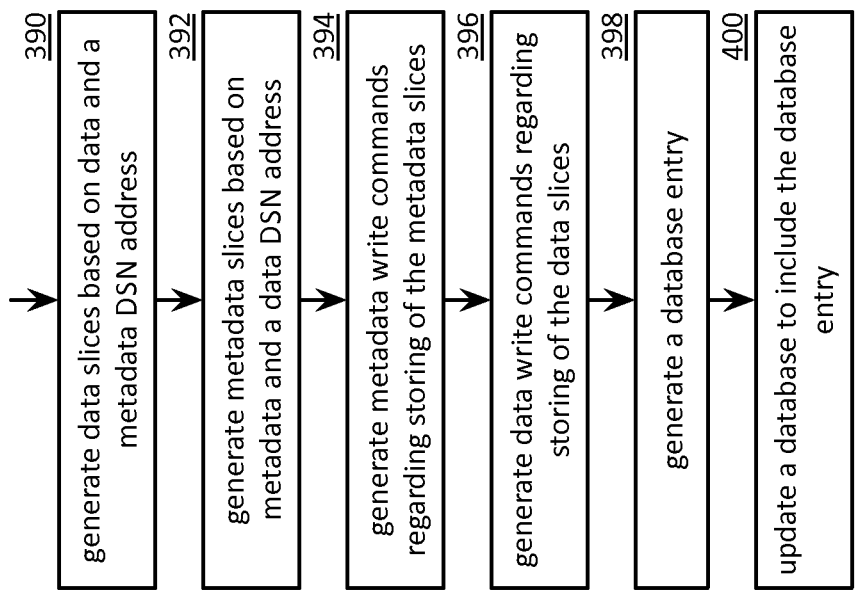
FIG. 15B is a flowchart illustrating an example of storing data in accordance with the present invention.

FIG. 15B is a flowchart illustrating an example of storing data. The method begins at step 390 where a processing module (e.g., of a dispersed storage (DS) processing unit) generates a set of encoded data slices based on a data segment of data and dispersed storage network (DSN) addressing information regarding metadata of the data. The generating the set of encoded data slices may include combining the DSN addressing information regarding metadata with the data segment to produce an amended data segment and dispersed storage error encoding the amended data segment to produce the set of encoded data slices. The generating the set of encoded data slices may further include dispersed storage error encoding the data segment to produce a preliminary set of encoded data slices and appending the DSN addressing information regarding the metadata with at least some of the encoded data slices of the preliminary set of encoded data slices to produce the set of encoded data slices.

The method continues at step 392 where the processing module generates a set of encoded metadata slices based on the metadata and DSN addressing information regarding the data. The generating the set of encoded metadata slices may include combining the DSN addressing information regarding the data with the metadata to produce amended metadata and dispersed storage error encoding the amended metadata to produce the set of encoded metadata slices. The generating the set of encoded metadata slices may further include dispersed storage error encoding the metadata to produce a preliminary set of encoded metadata slices and appending the DSN addressing information regarding the data with at least some of the encoded metadata slices of the preliminary set of encoded metadata slices to produce the set of encoded metadata slices.

The method continues at step 394 were the processing module generates a set of metadata write commands regarding storing the set of encoded metadata slices in a first set of dispersed storage (DS) units of DSN memory. The method continues at step 396 where the processing module generates a set of data segment write commands regarding storing the set of encoded data slices in a second set of DS units of the DSN memory. The method continues at step 398 where the processing module generates a database entry to include one or more of a data name of the data, the metadata, the DSN addressing information regarding the metadata, and DSN addressing information regarding the data. The method continues at step 400 where the processing module updates a database to include the database entry.

Figure 15C:
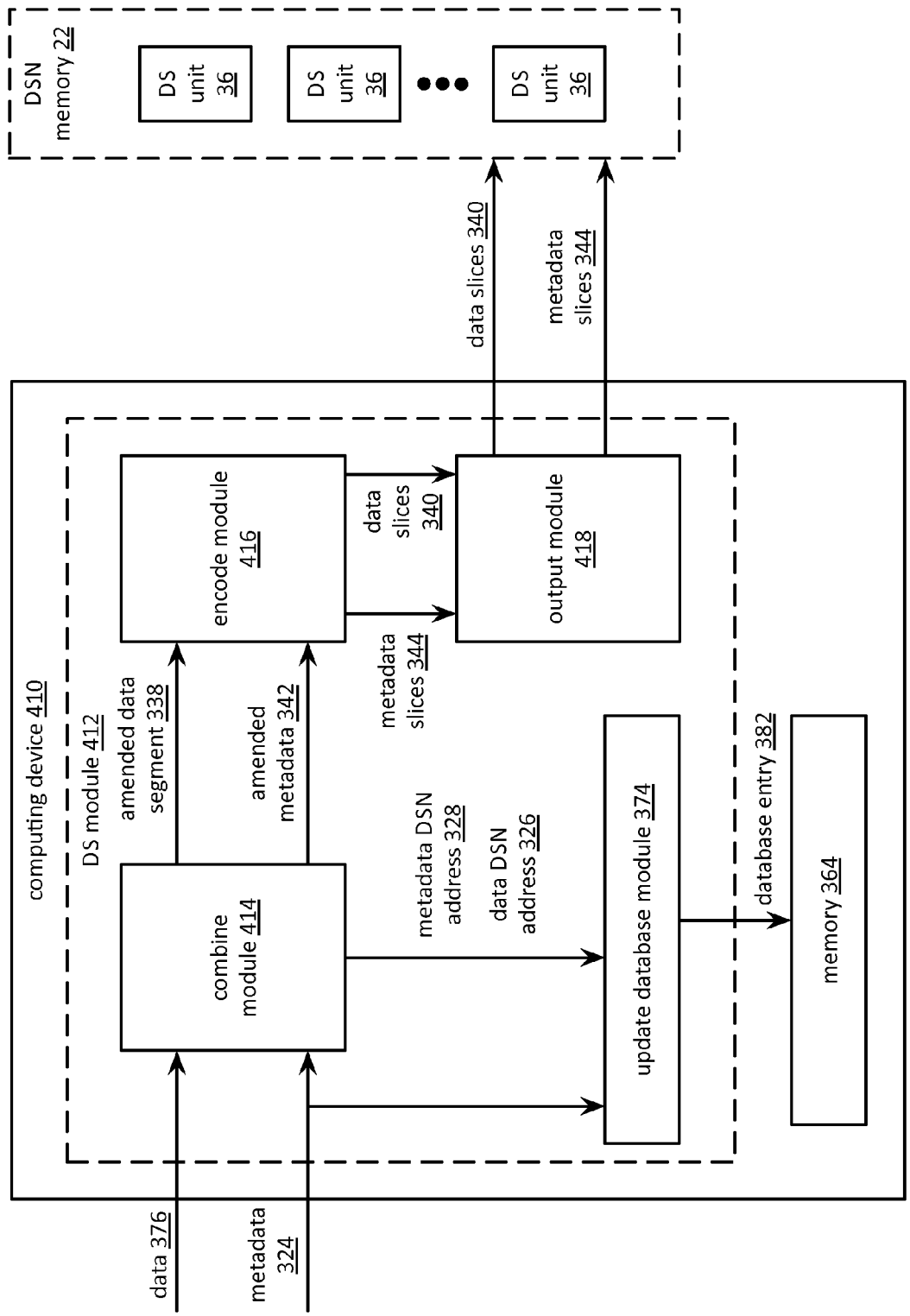
FIG. 15C is a schematic block diagram of another embodiment of a computing system in accordance with the present invention.

FIG. 15C is a schematic block diagram of another embodiment of a computing system that includes a computing device 410 and a dispersed storage network (DSN) memory 22. The DSN memory 22 includes one or more sets of dispersed storage (DS) units 36. The computing device 410 may be implemented as a dispersed storage (DS) processing unit, a user device, and/or a DS unit. The computing device 410 may store data 376 and metadata 324 of the data 376 in the DSN memory 22 in accordance with a storage approach. For example, the computing device 360 is a DS processing unit commissioned to receive data 376, generate metadata 324 of the data 376, store the data 376 in the DSN memory 22, and store the metadata 324 in the DSN memory 22. The computing device 410 includes a DS module 412 and memory 364. The DS module 412 includes a combine module 414, an encode module 416, an output module 418, and an update database module 374.

The combine module 414 functions to combine dispersed storage network (DSN) addressing information regarding metadata 324 of data 376 with a data segment of the data 376 to produce an amended data segment 338. The combine module 414 further functions to combine DSN addressing information 326 regarding the data 376 with the metadata 324 to produce amended metadata 342. The DSN addressing information 328 regarding the metadata 324 includes a metadata source name and or a set of metadata slice names. The DSN addressing information 326 regarding the data 376 includes a data source name and or a set of data slice names.

The encode module 416 functions to dispersed storage error encode the amended data segment 338 to produce a set of encoded data slices 340. The encode module 416 further functions to dispersed storage error encode the amended metadata 342 to produce a set of encoded metadata slices 344. The output module 418 outputs the set of encoded data slices 340 and the set of encoded metadata slices 344 for storage in the DSN memory 22.

The update database module 374 generates a database entry 382 to include one or more of a data name of the data 376, the metadata 324, the DSN addressing information 328 regarding the metadata 324, and DSN addressing information 326 regarding the data 376 and updates a database to include the database entry 382. For example, the update database module 374 stores the database entry 382 in the memory 364.

Figure 15D:
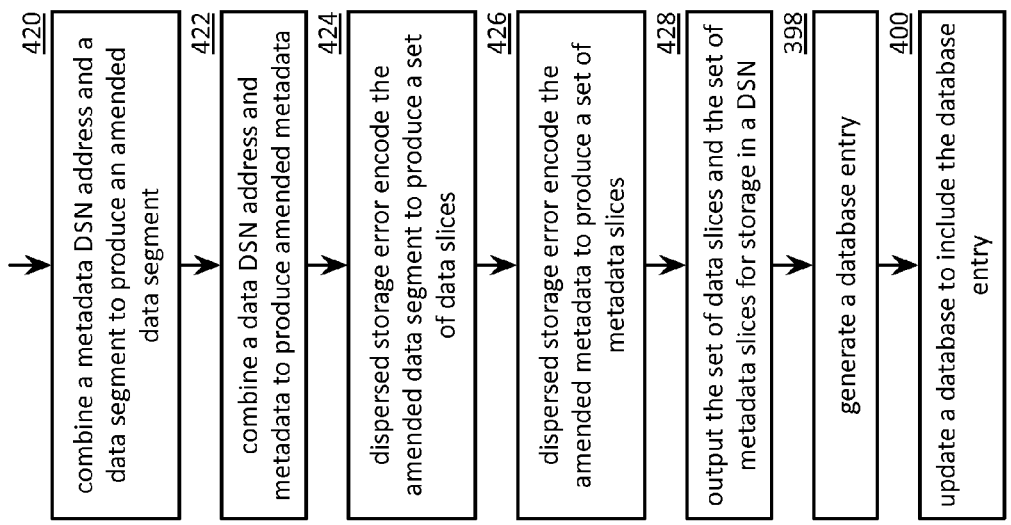
FIG. 15D is a flowchart illustrating another example of storing data in accordance with the present invention.

FIG. 15D is a flowchart illustrating another example of storing data, which includes similar steps to FIG. 15B. The method begins at step 420 where a processing module (e.g., of a dispersed storage (DS) processing unit) combines dispersed storage network (DSN) addressing information regarding metadata of data with a data segment of the data to produce an amended data segment. The method continues at step 422 where the processing module combines DSN addressing information regarding the data with the metadata to produce amended metadata. The method continues at step 424 where the processing module dispersed storage error encodes the amended data segment to produce a set of encoded data slices. The method continues at step 426 where the processing module dispersed storage error encodes the amended metadata to produce a set of encoded metadata slices. The method continues at step 428 where the processing module outputs the set of encoded data slices and the set of encoded metadata slices for storage in a dispersed storage network. The method continues with steps 398 and 400 of FIG. 15B where the processing module generates a database entry to include one or more of a data name of the data, the metadata, the DSN addressing information regarding the metadata, and DSN addressing information regarding the data and updates a database to include the database entry.

Figure 16:
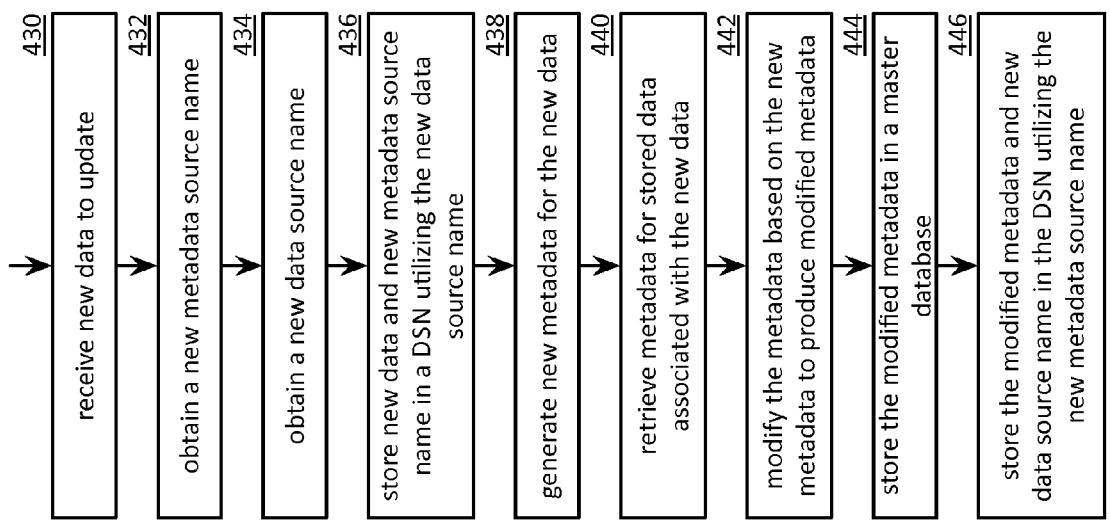
FIG. 16 is a flowchart illustrating an example of updating stored data in accordance with the present invention.

FIG. 16 is a flowchart illustrating an example of updating stored data. The method begins at step 430 where a processing module (e.g., of a dispersed storage (DS) processing unit) receives a new data update request. The request includes one or more of new data, a data name, and a user device identifier (ID). The method continues at step 432 where the processing module obtains a new metadata source name. The obtaining includes at least one of assigning a new metadata source name and a master database lookup utilizing the data name when reusing a metadata source name (e.g., to write over previously stored metadata). The method continues at step 434 where the processing module obtains a new data source name. The obtaining includes at least one of assigning a new data source name and a master database lookup utilizing the data name when reusing a data source name (e.g., to write over previously stored data associated with the same data name).

The method continues at step 436 where the processing module stores the new data and the new metadata source name in a dispersed storage network (DSN) memory utilizing the new data source name. The method continues at step 438 where the processing module generates new metadata for the new data. The method continues at step 440 where the processing module retrieves metadata for stored data associated with the new data. For example, the processing module retrieves the metadata from a master database based on the data name. As another example, the processing module retrieves the metadata from the DSN memory based on the metadata source name.

The method continues at step 442 where the processing module modifies the metadata based on the new metadata to produce modified metadata. For example, the modified metadata includes a new metadata revision indicator. The method continues at step 444 where the processing module stores the modified metadata in the master database. The method continues at step 446 where the processing module stores the modified metadata and the new data source name in the DSN memory utilizing the new metadata source name.

Figure 17:
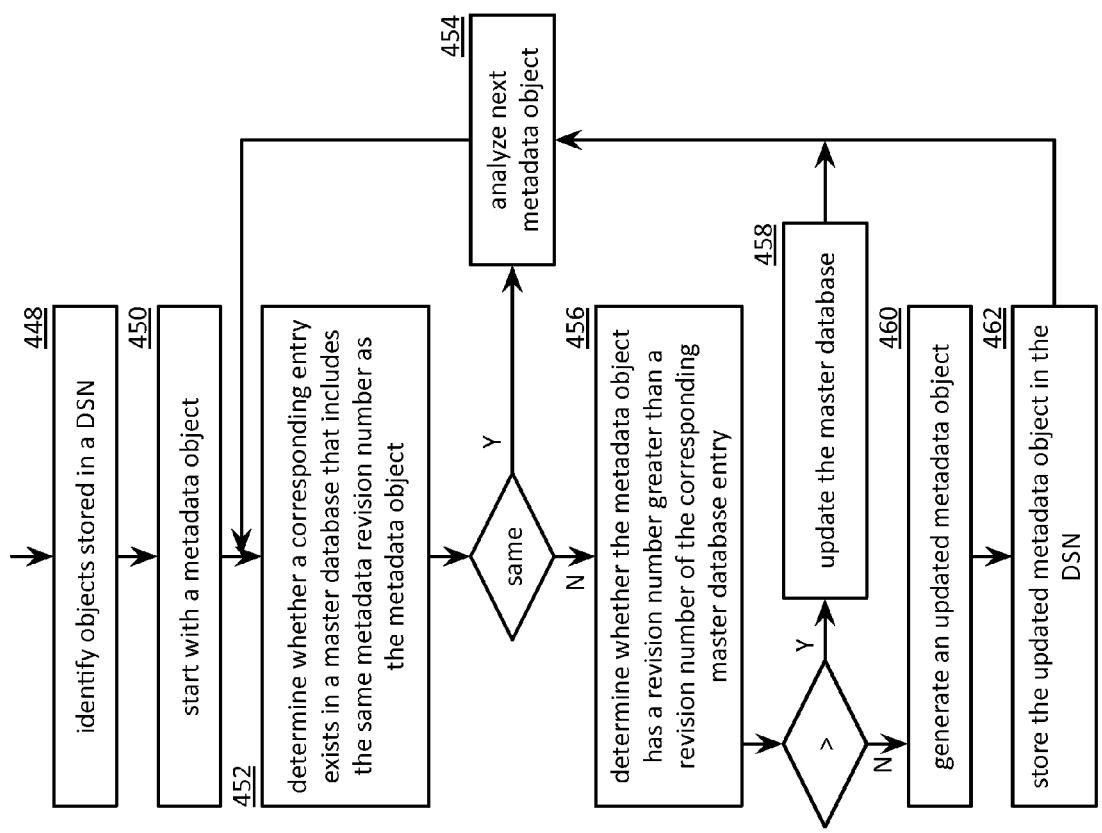
FIG. 17 is a flowchart illustrating an example of restoring data in accordance with the present invention.

FIG. 17 is a flowchart illustrating an example of restoring data. The method begins at step 448 where a processing module (e.g., of a dispersed storage (DS) processing unit) identifies objects stored in a dispersed storage network (DSN) memory to produce identified objects. The identifying includes at least one of detecting a system reboot, detecting a memory loss, receiving a restore request, and searching the DSN memory for slices associated with objects (e.g., data objects, metadata objects). The method continues at step 450 where the processing module starts a restoration loop by initiating an analysis with a metadata object of the identified objects.

The method continues at step 452 where the processing module determines whether a corresponding entry exists in a master database that includes the same metadata revision number as the metadata object. The method branches to step 456 when the processing module determines that the corresponding entry in the master database does not include the same metadata revision number as the metadata object. The method continues to step 454 when the processing module determines the corresponding entry in the master database includes the same metadata revision number as the metadata object. The method continues at step 454 where the processing module prepares to analyze a next metadata object of the plurality of the identified objects. The method loops back to step 452.

The method continues at step 456 where the processing module determines whether the metadata object has the revision number greater than the revision number of the corresponding master database entry. The method branches to step 460 when the processing module determines that the metadata object does not have the version number greater than the revision number of the corresponding master database entry. The method continues to step 458 when the processing module determines that the metadata object has the revision number greater than the revision number of the corresponding master database entry. The method continues at step 458 where the processing module updates a master database. The updating includes retrieving metadata from the DSN memory, modifying the corresponding master database entry to produce a modified master database, and storing the modified master database. The method branches to step 454.

The method continues at step 460 where the processing module generates an updated metadata object when the processing module determines that the metadata object does not have the revision number greater than the revision number of the corresponding master database entry. The generating includes combining the metadata from the master database entry with a data source name of the corresponding data to produce the updated metadata object. The method continues at step 462 where the processing module stores the updated metadata object in the DSN memory. The method branches to step 454 to analyze the next metadata object. The restoring may conclude when the method loops through each metadata object of the identified objects.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computing device, the method comprises:
   determining whether to complete downloading of a data segment of multi-media content to an accessing device, wherein the data segment is dispersed storage error encoded to produce a set of encoded data slices, wherein the accessing device receives a partial set of encoded data slices of the set of encoded data slices during a pre-download process of the multi-media content;
   when the downloading is to be completed:
      determining, for the accessing device, a user set of encoded data slices for accessing the data segment, wherein the user set of encoded data slices includes first and second sub-sets of encoded data slices of the set of encoded data slices, wherein the first sub-set of encoded data slices includes less than a decode threshold number of encoded data slices;
      determining whether encoded data slices of the partial set of encoded data slices substantially matches encoded data slices of the first sub-set of encoded data slices; and when the encoded data slices of the partial set of encoded data slices substantially matches encoded data slices of the first sub-set of encoded data slices, sending the second sub-set of encoded data slices to the accessing device.

2. The method of claim 1 further comprises:
   determining the user set of encoded data slices by accessing an authorized accessing list for the multi-media content.

3. The method of claim 1 further comprises:
   the first and second sub-sets of encoded data slices includes less encoded data slices than the set of encoded data slices.

4. The method of claim 1, wherein the determining whether the encoded data slices of the partial set of encoded data slices substantially matches the encoded data slices of the first sub-set of encoded data slices further comprises:
   issuing, to the accessing device, a slice name list request regarding the partial set of encoded data slices; and
   receiving a slice name list that includes slice names of the encoded data slices in the partial set of encoded data slices.

5. The method of claim 1 further comprises:
   when the encoded data slices of the partial set of encoded data slices does not substantially match encoded data slices of the first sub-set of encoded data slices, determining whether the partial set of encoded data slices includes an encoded data slice that is not part of the first sub-set of encoded data slices;
   when the partial set of encoded data slices does not include the encoded data slice that is not part of the first sub-set of encoded data slices, determining a missing encoded data slice based on a comparison of the partial set of encoded data slices and the first sub-set of encoded data slices; and
   sending the missing encoded data slice and the second sub-set of encoded data slices.

6. The method of claim 5 further comprises:
when the partial set of encoded data slices includes the encoded data slice that is not part of the first sub-set of encoded data slices, determining a course of action for the downloading.

7. The method of claim 6, wherein the course of action comprises:
determining whether the encoded data slice that is not part of the first sub-set of encoded data slices is part of the second sub-set of encoded data slices;
when the encoded data slice that is not part of the first sub-set of encoded data slices is part of the second sub-set of encoded data slices, sending remaining encoded data slices of the second sub-set of encoded data slices; and
when the encoded data slice that is not part of the first sub-set of encoded data slices is not part of the second sub-set of encoded data slices:
sending the second sub-set of encoded data slices; and
sending a message to delete the encoded data slice that is not part of the first sub-set of encoded data slices.

8. The method of claim 6, wherein the course of action comprises:
sending a delete message regarding the partial set of encoded data slices.

9. The method of claim 6, wherein the course of action comprises:
determining how the encoded data slice that is not part of the first sub-set of encoded data slices was obtained by the accessing device;
when the encoded data slice that is not part of the first sub-set of encoded data slices was obtained in an authorized manner, sending the second sub-set of encoded data slices; and
when the encoded data slice that is not part of the first sub-set of encoded data slices was obtained in an unauthorized manner, sending a delete message regarding the partial set of encoded data slices.

10. A dispersed storage (DS) module comprises:
a first module, when operable within a hardware computing device, causes the hardware computing device to:
determine whether to complete downloading of a data segment of multi-media content to an accessing device, wherein the data segment is dispersed storage error encoded to produce a set of encoded data slices, wherein the accessing device possesses a partial set of encoded data slices of the set of encoded data slices;
a second module, when operable within the hardware computing device, causes the hardware computing device to, when the downloading is to be completed:
determine, for the accessing device, a user set of encoded data slices for accessing the data segment, wherein the user set of encoded data slices includes first and second sub-sets of encoded data slices of the set of encoded data slices, wherein the first sub-set of encoded data slices includes less than a decode threshold number of encoded data slices;
a third module, when operable within the hardware computing device, causes the hardware computing device to, when the downloading is to be completed:
determine whether encoded data slices of the partial set of encoded data slices substantially matches encoded data slices of the first sub-set of encoded data slices; and a fourth module, when operable within the hardware computing device, causes the hardware computing device to, when the downloading is to be completed:
when the encoded data slices of the partial set of encoded data slices substantially matches encoded data slices of the first sub-set of encoded data slices, send the second sub-set of encoded data slices to the accessing device.

11. The DS module of claim 10, wherein the second module is further operable to:
determine the user set of encoded data slices by accessing an authorized accessing list for the multi-media content.

12. The DS module of claim 10 further comprises:
the first and second sub-sets of encoded data slices includes less encoded data slices than the set of encoded data slices.

13. The DS module of claim 10, wherein the third module is further operable to determine whether the encoded data slices of the partial set of encoded data slices substantially matches the encoded data slices of the first sub-set of encoded data slices by:
issuing, to the accessing device, a slice name list request regarding the partial set of encoded data slices; and
receiving a slice name list that includes slice names of the encoded data slices in the partial set of encoded data slices.

14. The DS module of claim 10 further comprises:
when the encoded data slices of the partial set of encoded data slices does not substantially match encoded data slices of the first sub-set of encoded data slices, the third module is further operable to determine whether the partial set of encoded data slices includes an encoded data slice that is not part of the first sub-set of encoded data slices;
when the partial set of encoded data slices does not include the encoded data slice that is not part of the first sub-set of encoded data slices, the third module is further operable to determine a missing encoded data slice based on a comparison of the partial set of encoded data slices and the first sub-set of encoded data slices; and
the fourth module is further operable to send the missing encoded data slice and the second sub-set of encoded data slices.

15. The DS module of claim 14 further comprises:
when the partial set of encoded data slices includes the encoded data slice that is not part of the first sub-set of encoded data slices, the third module is further operable to determine a course of action for the downloading.

16. The DS module of claim 15, wherein the course of action comprises:
the third module is further operable to:
determine whether the encoded data slice that is not part of the first sub-set of encoded data slices is part of the second sub-set of encoded data slices;
the fourth module is further operable to:
when the encoded data slice that is not part of the first sub-set of encoded data slices is part of the second sub-set of encoded data slices, send remaining encoded data slices of the second sub-set of encoded data slices; and
when the encoded data slice that is not part of the first sub-set of encoded data slices is not part of the second sub-set of encoded data slices:

send the second sub-set of encoded data slices; and
send a message to delete the encoded data slice that is not part of the first sub-set of encoded data slices.

17. The DS module of claim 15, wherein the course of action comprises:
the fourth module is further operable to send a delete message regarding the partial set of encoded data slices.

18. The DS module of claim 15, wherein the course of action comprises:
the third module is further operable to:
determine how the encoded data slice that is not part of the first sub-set of encoded data slices was obtained by the accessing device;
the fourth module is further operable to:
when the encoded data slice that is not part of the first sub-set of encoded data slices was obtained in an authorized manner, send the second sub-set of encoded data slices; and
when the encoded data slice that is not part of the first sub-set of encoded data slices was obtained in an unauthorized manner, send a delete message regarding the partial set of encoded data slices.

* * * * *